United States Patent
Shimo et al.

(10) Patent No.: US 9,806,398 B2
(45) Date of Patent: *Oct. 31, 2017

(54) WINDOW ASSEMBLY WITH TRANSPARENT LAYER AND AN ANTENNA ELEMENT

(71) Applicants: AGC AUTOMOTIVE AMERICAS R&D, INC., Ypsilanti, MI (US); AGC Glass Europe, Louvain-la-Nueve (BE)

(72) Inventors: Kenichiro Shimo, Woluwe-Saint-Pierre (BE); Peter Masschelein, Huldenberg (BE); Romain Dacquin, Basècles (BE); Fredrick M. Schaible, Grosse Point Park, MI (US); Jun Noda, Canton, MI (US); Jesus Gedde, Dexter, MI (US); Tatuo Yajima, Ann Arbor, MI (US)

(73) Assignees: AGC AUTOMOTIVE AMERICAS R&D, INC., Ypsilanti, MI (US); AGC GLASS EUROPE, Louvain-la-Neuve (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,003

(22) Filed: May 11, 2016

(65) Prior Publication Data

US 2016/0254586 A1    Sep. 1, 2016

Related U.S. Application Data

(63) Continuation-in-part of application No. 14/161,466, filed on Jan. 22, 2014, now Pat. No. 9,406,996.

(51) Int. Cl.
*H01Q 1/32* (2006.01)
*H01Q 1/12* (2006.01)
*B60J 3/00* (2006.01)

(52) U.S. Cl.
CPC ............ *H01Q 1/1271* (2013.01); *B60J 3/007* (2013.01)

(58) Field of Classification Search
CPC ....................................................... H01Q 1/32
(Continued)

(56) References Cited

U.S. PATENT DOCUMENTS

| 3,728,732 A | 4/1973 | Igarashi |
| 3,945,014 A | 3/1976 | Kunert et al. |

(Continued)

FOREIGN PATENT DOCUMENTS

| CN | 3660226 | 6/2007 |
| EP | 0 720 249 A2 | 7/1996 |

(Continued)

OTHER PUBLICATIONS

International Search Report for Application No. PCT/US2016/031832 dated Jan. 12, 2017, 3 pages.

(Continued)

*Primary Examiner* — Huedung Mancuso
(74) *Attorney, Agent, or Firm* — Howard & Howard Attorneys PLLC

(57) ABSTRACT

A window assembly includes a substrate with an electrically conductive transparent layer that defines an area having a periphery. An outer region devoid of the transparent layer is defined adjacent to and along the periphery. An elongated antenna element is disposed in the outer region. A feeding element couples to the antenna element for energizing the antenna element. The area of the transparent layer defines at least two protrusions being spaced apart from one another and extending integrally from the area and into the outer region. The antenna element abuts and is in direct electrical contact with the at least two protrusions. The feeding element couples to the antenna element at a location (Continued)

between the at least two protrusions or at one of the at least two protrusions.

25 Claims, 10 Drawing Sheets

(58) Field of Classification Search
USPC .................. 343/713, 711, 712, 704, 906
See application file for complete search history.

(56) References Cited

U.S. PATENT DOCUMENTS

| | | |
|---|---|---|
| 4,072,955 A | 2/1978 | Comastri et al. |
| 4,768,037 A | 8/1988 | Inaba et al. |
| 4,849,766 A | 7/1989 | Inaba et al. |
| 5,005,020 A | 4/1991 | Ogawa et al. |
| 5,132,161 A | 7/1992 | Shibata et al. |
| 5,142,460 A | 8/1992 | McAtee |
| 5,670,966 A | 9/1997 | Dishart et al. |
| 5,790,080 A | 8/1998 | Apostolos |
| 5,856,035 A | 1/1999 | Khandkar et al. |
| D408,360 S | 4/1999 | Kosmala |
| 5,898,407 A | 4/1999 | Paulus et al. |
| 5,973,648 A | 10/1999 | Lindenmeier et al. |
| 5,999,136 A | 12/1999 | Winter et al. |
| 6,150,985 A | 11/2000 | Pritchard |
| D434,752 S | 12/2000 | Kudo |
| 6,211,831 B1 | 4/2001 | Nagy et al. |
| 6,239,758 B1 | 5/2001 | Fuchs et al. |
| 6,320,276 B1 | 11/2001 | Sauer |
| D453,319 S | 2/2002 | Yokoyama |
| 6,368,739 B1 | 4/2002 | Frost et al. |
| 6,417,811 B1 | 7/2002 | Adrian |
| 6,624,794 B1 | 9/2003 | Wendt |
| D490,801 S | 6/2004 | Iwai et al. |
| 6,842,158 B2 | 1/2005 | Jo et al. |
| 6,870,506 B2 | 3/2005 | Chen et al. |
| 6,906,287 B2 | 6/2005 | Sol |
| D535,290 S | 1/2007 | Su et al. |
| D543,974 S | 6/2007 | Oshima et al. |
| D544,469 S | 6/2007 | Oshima |
| 7,333,067 B2 | 2/2008 | Hung et al. |
| 7,405,704 B1 | 7/2008 | Lin et al. |
| 7,427,961 B2 | 9/2008 | Song et al. |
| D588,585 S | 3/2009 | Montgomery et al. |
| D588,586 S | 3/2009 | Montgomery et al. |
| 7,508,345 B2 | 3/2009 | Pan et al. |
| 7,518,558 B2 | 4/2009 | Kato et al. |
| D602,010 S | 10/2009 | Yakubo |
| 7,656,357 B2 | 2/2010 | Ishibashi et al. |
| D615,966 S | 5/2010 | Shinkawa et al. |
| D616,163 S | 5/2010 | Nam et al. |
| D618,223 S | 6/2010 | Tsai et al. |
| D620,857 S | 8/2010 | Noguchi et al. |
| D621,819 S | 8/2010 | Tsai et al. |
| 7,847,745 B2 | 12/2010 | Martin |
| D635,560 S | 4/2011 | Tsai |
| D635,964 S | 4/2011 | Podduturi |
| D636,382 S | 4/2011 | Podduturi |
| 8,004,465 B2 | 8/2011 | Schano |
| D650,370 S | 12/2011 | Huang et al. |
| 8,081,130 B2 | 12/2011 | Apostolos et al. |
| 8,134,505 B2 | 3/2012 | Yamagajo et al. |
| 8,268,222 B2 | 9/2012 | Aisenbrey |
| 8,269,676 B2 | 9/2012 | Lin |
| D675,195 S | 1/2013 | Huang et al. |
| 8,350,766 B2 | 1/2013 | Hisaeda |
| D676,429 S | 2/2013 | Gosalia et al. |
| 8,451,178 B2 | 5/2013 | Sakai |
| 8,466,842 B2 | 6/2013 | Dai |
| D686,600 S | 7/2013 | Yang |
| D689,474 S | 9/2013 | Yang et al. |
| 8,576,130 B2 | 11/2013 | Dai |
| 8,590,797 B2 | 11/2013 | Kato et al. |
| D694,738 S | 12/2013 | Yang |

| | | |
|---|---|---|
| 8,723,750 B2 | 5/2014 | Podduturi |
| 8,830,128 B2 | 9/2014 | Fuchs et al. |
| 8,906,523 B2 | 12/2014 | Brantner |
| D747,298 S | 1/2016 | Lee et al. |
| D750,049 S | 2/2016 | Podduturi |
| D750,050 S | 2/2016 | Podduturi |
| 9,406,996 B2 | 8/2016 | Lee et al. |
| 2002/0036593 A1 | 3/2002 | Ying |
| 2002/0192886 A1 | 12/2002 | Inoue |
| 2003/0034927 A1 | 2/2003 | Deininger |
| 2003/0156065 A1 | 8/2003 | Jo et al. |
| 2003/0230017 A1 | 12/2003 | Geyer |
| 2004/0056805 A1 | 3/2004 | Chen |
| 2004/0066341 A1 | 4/2004 | Ito et al. |
| 2004/0108957 A1 | 6/2004 | Umehara et al. |
| 2004/0183728 A1 | 9/2004 | Zinanti et al. |
| 2004/0200821 A1 | 10/2004 | Voeltzel |
| 2004/0222936 A1 | 11/2004 | Hung et al. |
| 2004/0257291 A1 | 12/2004 | Man et al. |
| 2005/0035919 A1 | 2/2005 | Yang et al. |
| 2005/0202295 A1 | 9/2005 | Lee et al. |
| 2006/0055610 A1 | 3/2006 | Borisov et al. |
| 2006/0214863 A1 | 9/2006 | Fujimoto et al. |
| 2007/0040028 A1 | 2/2007 | Kawamata |
| 2008/0068276 A1 | 3/2008 | Noro |
| 2008/0079639 A1 | 4/2008 | Jen-Huan |
| 2008/0143630 A1 | 6/2008 | Kato et al. |
| 2008/0143632 A1 | 6/2008 | Apostolos |
| 2008/0158075 A1 | 7/2008 | Villarroel et al. |
| 2008/0218417 A1 | 9/2008 | Gillette |
| 2008/0258992 A1 | 10/2008 | Tsai et al. |
| 2008/0283173 A1 | 11/2008 | Hisaeda |
| 2008/0284850 A1 | 11/2008 | Blaesing et al. |
| 2009/0002244 A1 | 1/2009 | Woo |
| 2009/0115672 A1 | 5/2009 | Nysen |
| 2009/0267857 A1 | 10/2009 | Liu et al. |
| 2010/0007567 A1 | 1/2010 | Hilgers |
| 2010/0060526 A1 | 3/2010 | Cheng |
| 2010/0283694 A1 | 11/2010 | Kato |
| 2011/0043412 A1 | 2/2011 | Kim |
| 2011/0068986 A1 | 3/2011 | Tezuka et al. |
| 2011/0241961 A1 | 10/2011 | Aizawa |
| 2012/0256798 A1 | 10/2012 | Paulus et al. |
| 2012/0268338 A1 | 10/2012 | Yoo et al. |
| 2012/0280873 A1 | 11/2012 | Rofougaran |
| 2012/0306704 A1 | 12/2012 | Li et al. |
| 2013/0141297 A1 | 6/2013 | Gomme et al. |
| 2014/0015716 A1* | 1/2014 | Villarroel ............. H01Q 1/1271 343/713 |
| 2014/0266477 A1 | 9/2014 | Sekiguchi et al. |
| 2014/0266931 A1* | 9/2014 | Shkembi ............. H01Q 1/3291 343/712 |
| 2014/0361948 A1 | 12/2014 | Tanaka et al. |
| 2015/0207203 A1 | 7/2015 | Lee et al. |

FOREIGN PATENT DOCUMENTS

| | | |
|---|---|---|
| JP | S 63-155805 A | 6/1988 |
| JP | D 1185796 | 9/2003 |
| JP | D 1224231 | 12/2004 |
| JP | 2005-012587 A | 1/2005 |
| JP | D 1239259 | 5/2005 |
| JP | D 1263798 | 2/2006 |
| JP | D 1291197 | 1/2007 |
| JP | D 1350409 | 2/2009 |
| JP | D 1421524 | 8/2011 |
| KR | 300413160 | 5/2006 |
| KR | 3000552847 | 2/2010 |
| WO | WO 2012/079002 A1 | 6/2012 |
| WO | WO 2015/112135 A1 | 7/2015 |

OTHER PUBLICATIONS

English language abstract and machine-assisted English translation for JP 2005-012587 extracted from espacenet.com database on Jan. 26, 2017, 17 pages.
International Search Report for Application No. PCT/US2014/012526 dated Oct. 9, 2014, 4 pages.

(56) References Cited

OTHER PUBLICATIONS

English language abstract for JPS 63-155805 extracted from PAJ database on Oct. 16, 2014, 1 page.
English language abstract/description for JPD 1185796 extracted from https://www9.orbit.com/index.html?ticket=2ddf4357-c380-4cdc-ba25-4d0fe264c76d&locale=en&embedded+false&locale=en#DesignFullPage on Jul. 29, 2015, 1 page.
English language abstract/description for JPD 1224231 extracted from https://www9.orbit.com/index.html?ticket=2ddf4357-c380-4cdc-ba25-4d0fe264c76d&locale=en&embedded+false&locale=en#DesignFullPage on Jul. 29, 2015, 1 page.
English language abstract/description for JPD 1291197 extracted from https://www9.orbit.com/index.html?ticket=2ddf4357-c380-4cdc-ba25-4d0fe264c76d&locale=en&embedded+false&locale=en#DesignFullPage on Jul. 29, 2015, 1 page.
English language abstract/description for JPD 1421524 extracted from https://www9.orbit.com/index.html?ticket=2ddf4357-c380-4cdc-ba25-4d0fe264c76d&locale=en&embedded+false&locale=en#DesignFullPage on Jul. 29, 2015, 1 page.
English language abstract/description for KR 300413160 extracted from https://www33.orbit.com/?ticket=b564dbcb-25fa-4896-bef0-9645dd58353e&locale=en&embedded+false#DesignFullPage on Feb. 25, 2016, 1 page.
Design U.S. Appl. No. 29/480,024, filed Jan. 22, 2014, 16 pages.
Utility U.S. Appl. No. 15/195,223, filed Jun. 28, 2016.
International Patent Application No. PCT/US2016/031832 filed May 11, 2016.
bayhas.com, "Welcome to the Model R230 SL Class!", online, wayback date Mar. 18, 2015, downloaded on Feb. 25, 2015 from http://web.archive.org/web20150318223746/http://bayhas.com/mercedes/r230/contents/electrical/elect_antenna.htm, 2 pages.
Windscreen Mount Antenna, update Apr. 2011, online: http://www.gerrelt.nl/section-aerodynamics/aerody-windscreen-antenna.html, [site visited Jul. 29, 2015 7:30:57 PM].

\* cited by examiner

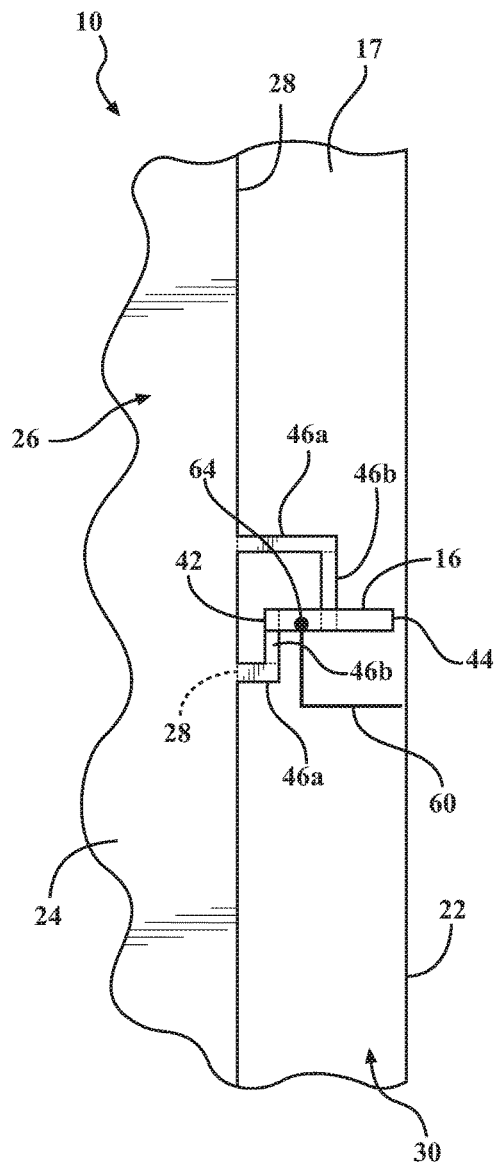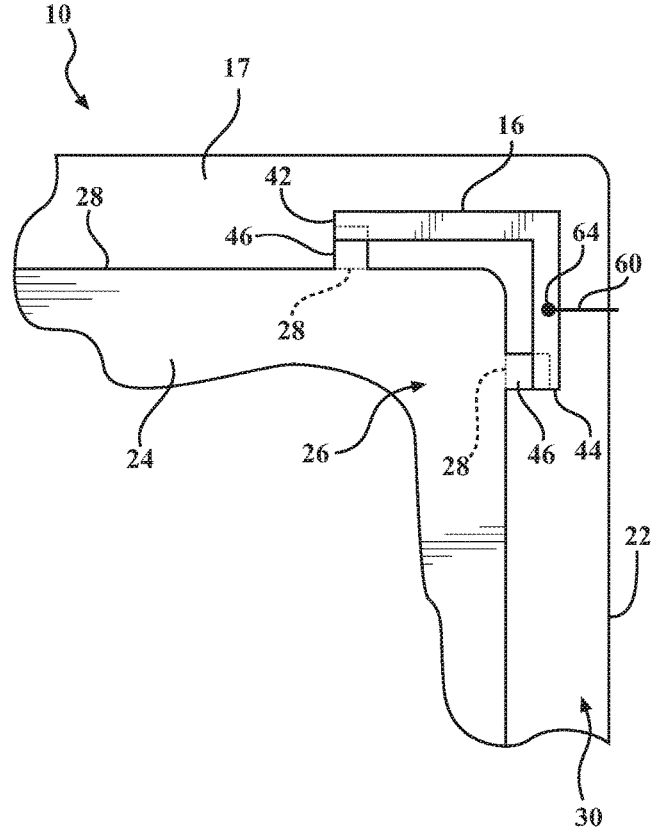
FIG. 13
FIG. 14

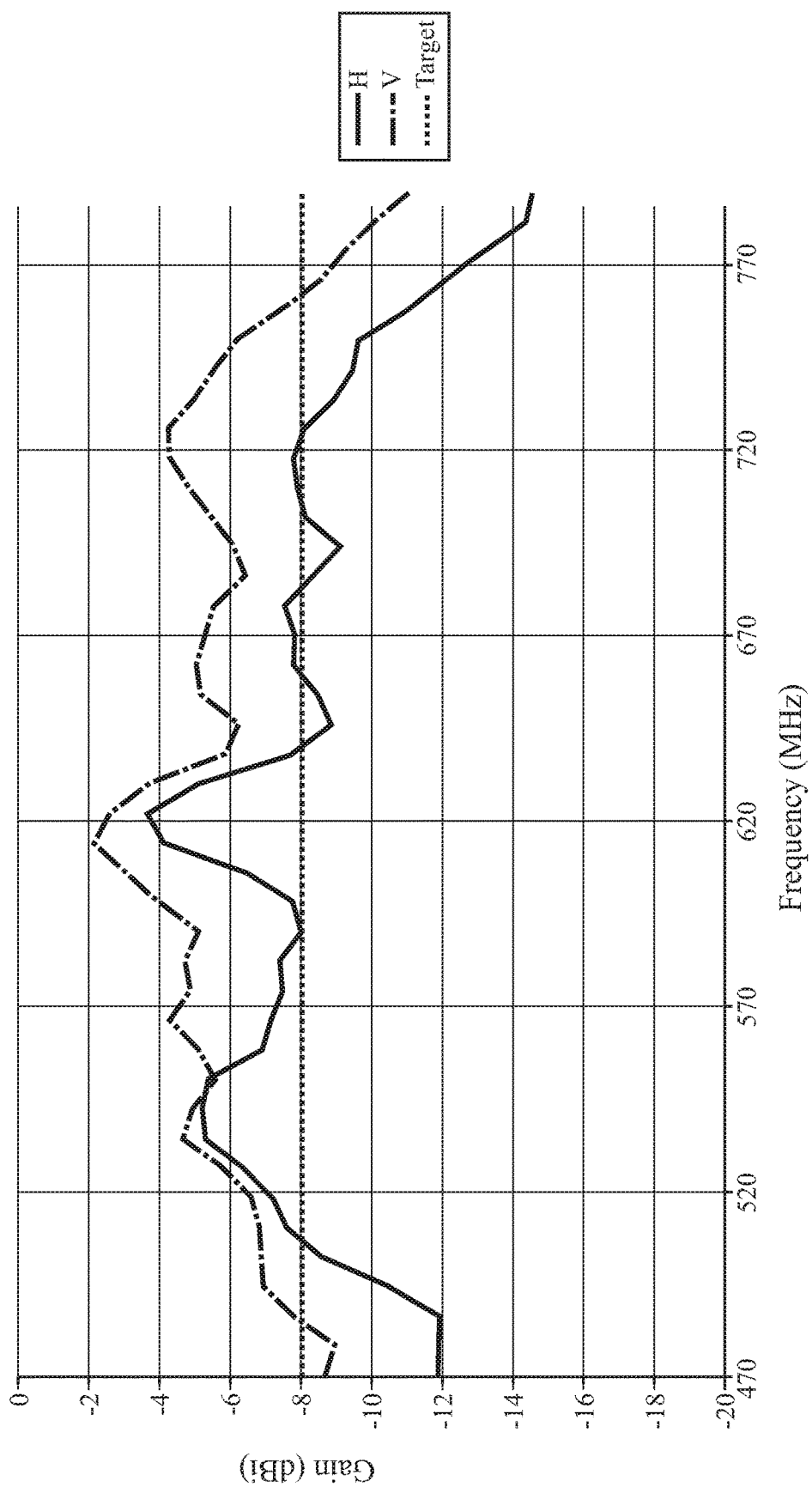

WINDOW ASSEMBLY WITH TRANSPARENT LAYER AND AN ANTENNA ELEMENT

CROSS REFERENCE TO RELATED APPLICATIONS

This application is a continuation-in-part of U.S. non-provisional patent application Ser. No. 14/161,466, filed Jan. 22, 2014, the disclosure of which is hereby incorporated by reference in its entirety.

BACKGROUND

1. Technical Field

The subject invention generally relates to a window assembly. More specifically, the subject invention relates to a window assembly having a transparent layer and an antenna element.

2. Description of the Related Art

Recently, there is increasing demand for vehicle windshields to have an electrically conductive transparent layer embedded within the windshield for various purposes, such as reflecting infrared radiation from sunlight penetrating the windshield. In so doing, the transparent layer reduces the amount of infrared radiation entering an interior of the vehicle. As a result, during warm months, less energy is required to lower the interior temperature of the vehicle.

One or more antennas are frequently incorporated on or within the windshield having such transparent layer. Accommodating the antenna(s) when the transparent layer is present is a difficult task. Firstly, the transparent layer is typically applied over a substantial part of the windshield, often spanning the entire field of view of the driver. This is done to maximize efficiency of the transparent layer to reflect infrared radiation. Furthermore, the transparent layer is conductive, and therefore, has an electromagnetic impact on radio waves, such as radio waves propagating to or from the antenna(s). Consequently, there remains little room on the windshield to place the antenna(s) without encountering detrimental electromagnetic interference. Additionally, tolerances between the antenna(s) and the transparent layer are difficult to manage and the slightest deviation in such tolerances can have significant impact on antenna performance.

Therefore, there remains the opportunity to develop a window assembly that solves at least the aforementioned problems.

SUMMARY AND ADVANTAGES

A window assembly is provided. The window assembly includes a substrate and a transparent layer disposed on the substrate. The transparent layer comprises a metal compound such that the transparent layer is electrically conductive. The transparent layer defines an area having a periphery. An outer region devoid of the transparent layer is defined on the substrate adjacent to and along the periphery of the transparent layer. An antenna element is disposed on the substrate in the outer region. The antenna element is elongated and defines a first end and an opposing second end. A feeding element is coupled to the antenna element for energizing the antenna element. The area of the transparent layer defines at least two protrusions being spaced apart from one another and extending integrally from the area and into the outer region. The antenna element abuts and is in direct electrical contact with the at least two protrusions. The feeding element is coupled to the antenna element at a location between the at least two protrusions or at one of the protrusions.

The window assembly advantageously provides robust and efficient antenna performance. The antenna element and the at least two protrusions beneficially play a role in transmission or reception of radio signals. Direct electrical contact between the antenna element and the at least two protrusions alters antenna radiation pattern and antenna impedance characteristics in a desirable fashion. Having the antenna element disposed in the outer region advantageously maximizes and improves antenna impedance matching and radiation pattern altering. Moreover, by abutting and being in direct electrical contact with the at least two protrusions of the transparent layer, the antenna element advantageously provides a DC connection to the transparent layer. This DC connection allows a footprint of the antenna element to be minimized.

Additionally, the at least two protrusions allow for easy connection of the antenna element during manufacturing. The at least two protrusions extend into the outer region to allow the antenna to easily connect thereto without having to extend into the main area of the transparent layer. As such, the antenna experiences minimized detrimental electromagnetic interference from the transparent layer. Additionally, the at least two protrusions allow tolerances between the antenna element and the transparent layer to be more easily managed thereby reducing the possibility that deviations in tolerance will impact performance of the antenna element. Those skilled in the art appreciate that the subject invention may exhibit or provide other advantages not specifically recited herein.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 13 is a plan view of the window assembly having two protrusions od different configuration from one another and each having a plurality of protrusion segments and with the antenna element abutting both protrusions such that the antenna element is oriented perpendicular to the periphery of the area of the transparent layer, according to one embodiment of the present invention;

FIG. 14 is a plan view of the window assembly having one protrusion extending from one edge of the area of the transparent layer and another protrusion extending from another edge of the area of the transparent layer wherein the antenna element wraps around a corner of the area to abut the protrusions at opposing ends of the antenna element, according to one embodiment of the present invention;

FIG. 16 is a frequency-gain chart illustrating antenna performance of the window assembly in TV Bands 4 and 5, according to one embodiment of the present invention.

DETAILED DESCRIPTION OF THE INVENTION

Figure 1:
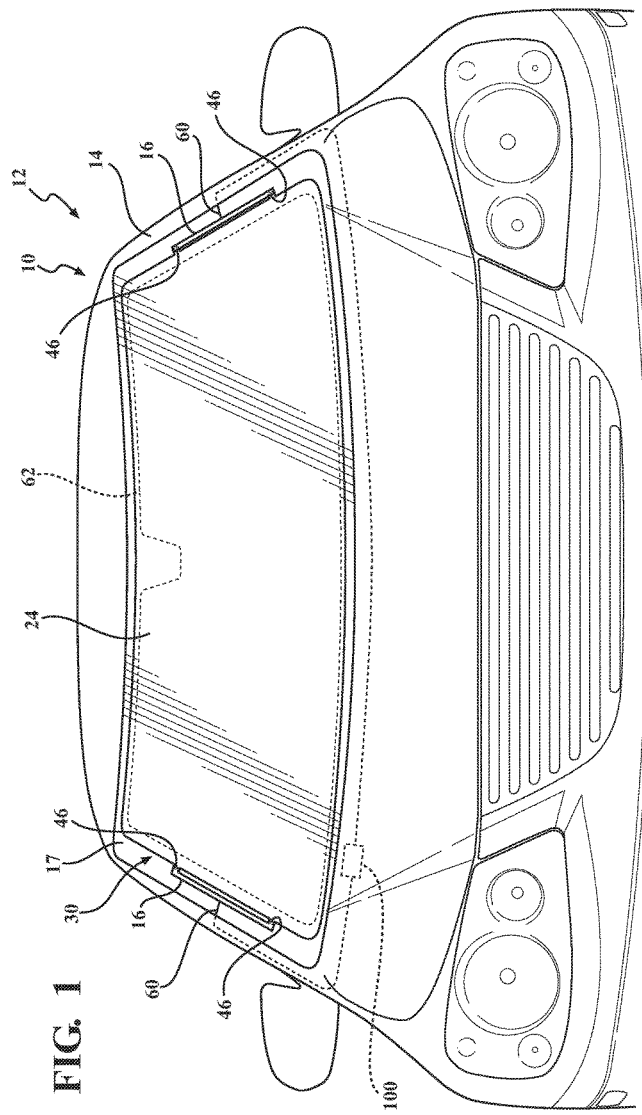
FIG. 1 is a perspective view of a vehicle having a window assembly with a plurality of antenna elements each connecting to protrusions of integrally extending from an area of a transparent layer, according to one embodiment of the present invention.

Referring to the Figures, wherein like numerals indicate corresponding parts throughout the several views, a window assembly is shown generally at 10 in FIG. 1. In one embodiment, as shown in FIG. 1, the window assembly 10 is for a vehicle 12. The window assembly 10 may be a front window (windshield) as illustrated in FIG. 1. Alternatively, the window assembly 10 may be a rear window (backlite), a roof window (sunroof), or any other window of the vehicle 12. Typically, the vehicle 12 defines an aperture and the window assembly 10 closes the aperture. A window frame 14 of the vehicle 12, which is electrically conductive, conventionally defines the aperture. The window assembly 10 may be for applications other than for vehicles 12. For example, the window assembly 10 may be for architectural applications such as homes, buildings, and the like.

As shown throughout the Figures, the window assembly 10 includes an antenna element 16. In one embodiment, as shown in FIG. 1, the window assembly 10 may also include a plurality of antenna elements 16. As will be described in detail below, the antenna element 16 transmits or receives radio frequency signals.

Figure 2:
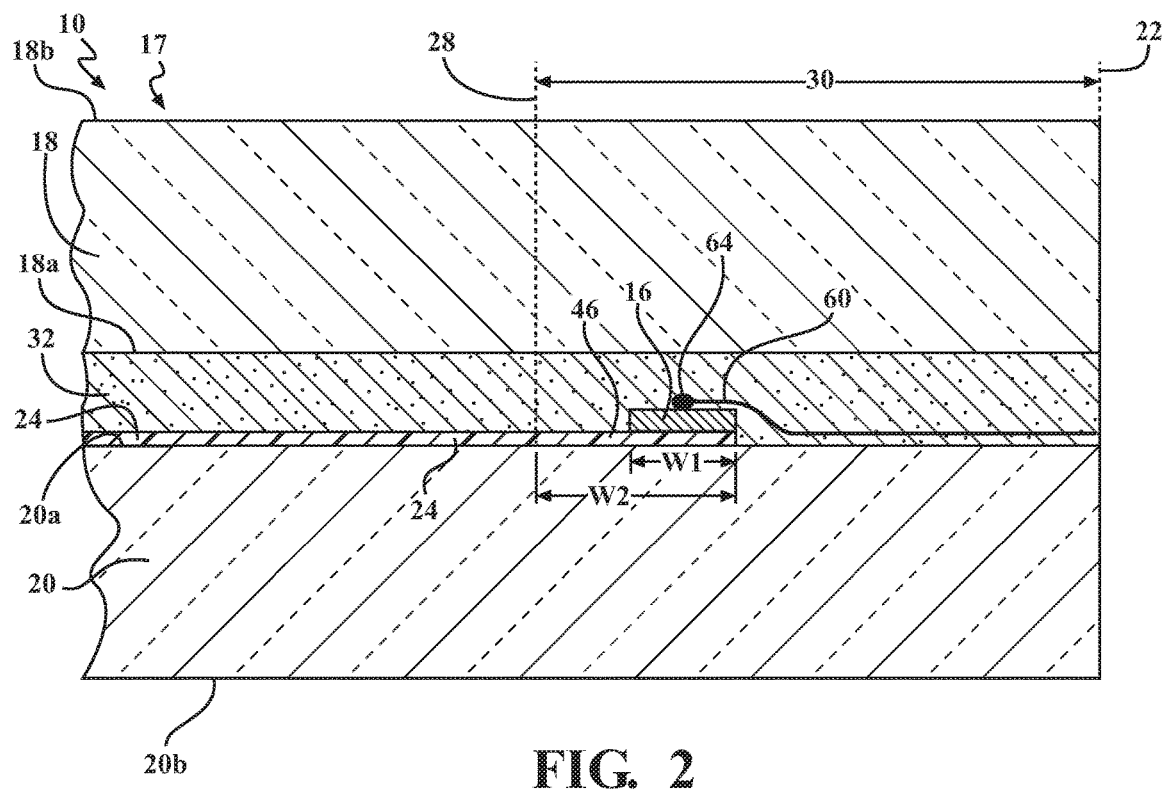
FIG. 2 is a cross-sectional partial view of the window assembly of FIG. 5 having the transparent layer, the antenna element, and a feeding element sandwiched between exterior and interior substrates of the window assembly, according to one embodiment of the present invention.
Figure 3:
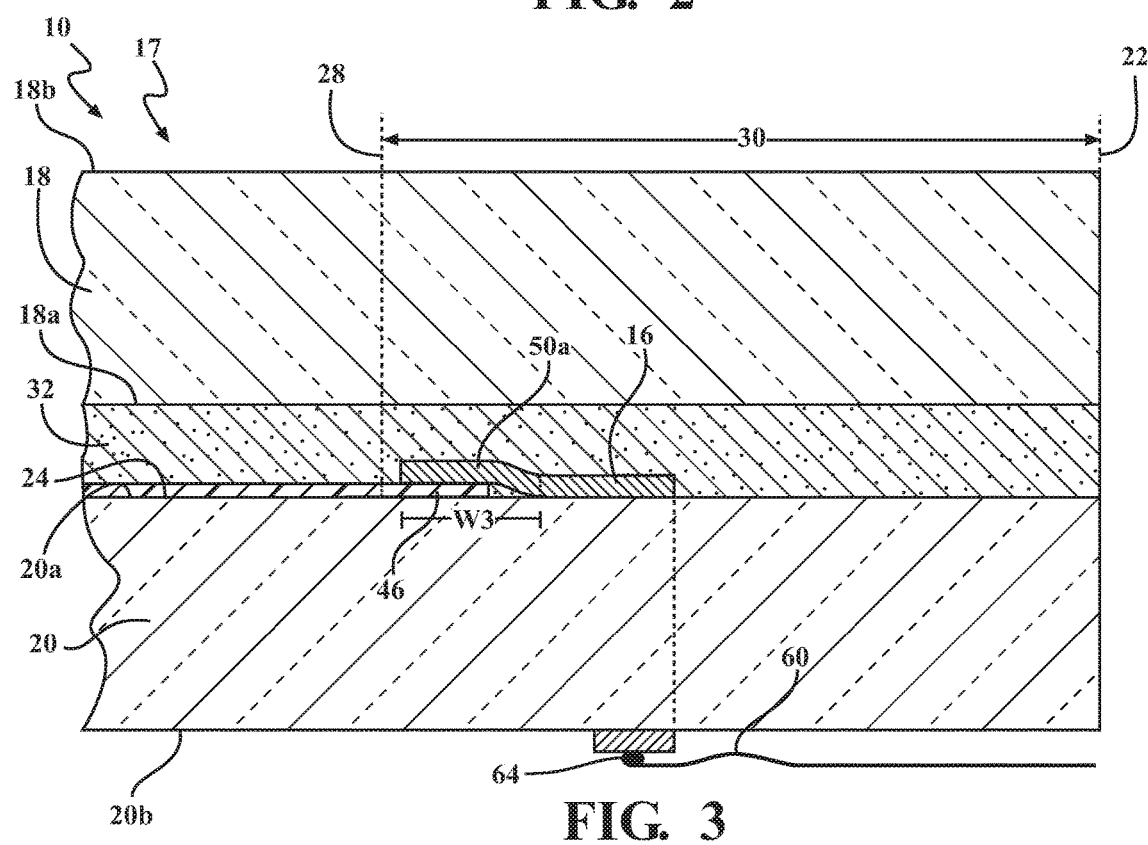
FIG. 3 is a cross-sectional partial view of the window assembly of FIG. 6 having the transparent layer and the antenna element sandwiched between the exterior and interior substrates of the window assembly and with the feeding element spaced from and capacitively coupled to the antenna element, according to one embodiment of the present invention.

As shown in FIGS. 2 and 3, the window assembly 10 includes a substrate 17. In one embodiment, the window assembly 10 includes an exterior substrate 18 and an interior substrate 20 disposed adjacent the exterior substrate 18. As such, in this embodiment, the substrate 17 includes a combination of the exterior and interior substrates 18, 20. In another embodiment, the substrate 17 may comprise a single layer. The substrate 17 may have other configurations not specifically recited herein.

In FIGS. 2 and 3, the exterior substrate 18 is disposed parallel to and spaced from the interior substrate 20 such that the substrates 18, 20 are not contacting one another. Alternatively, the exterior substrate 18 may directly abut the interior substrate 20.

Typically, the exterior and interior substrates 18, 20 are electrically non-conductive. As mentioned herein, the term "non-conductive" refers generally to a material, such as an insulator or dielectric, that when placed between conductors at different electric potentials, permits a negligible current to flow through the material. The exterior and interior substrates 18, 20 are also substantially transparent to light. However, it is to be appreciated that the exterior and interior substrates 18, 20 may be colored or tinted and still be substantially transparent to light. As used herein, the term "substantially transparent" is defined generally as having a visible light transmittance of greater than sixty percent.

The exterior and interior substrates 18, 20 are preferably joined together to form the window assembly 10. In one embodiment, the exterior and interior substrates 18, 20 are panes of glass. The panes of glass are preferably automotive glass and, more preferably, soda-lime-silica glass. However, the exterior and interior substrates 18, 20 may be plastic, fiberglass, laminate or other suitable electrically non-conductive and substantially transparent material. For automotive applications, the exterior and interior substrates 18, 20 are each typically 3.2 mm thick. However, the exterior and interior substrates 18, 20 may have any suitable thickness.

In FIGS. 2 and 3, each of the exterior and interior substrates 18, 20 has an inner surface 18*a*, 20*a* and an outer surface 18*b*, 20*b*. In one embodiment, the outer surface 18*b* of the exterior substrate 18 faces an exterior of the vehicle 12 and the outer surface 20*b* of the interior substrate 20 faces an interior, or passenger compartment, of the vehicle 12. The inner surfaces 18*a*, 20*a* of the exterior and interior substrates 18, 20 typically face one another when the exterior and interior substrates 18, 20 are joined together to form the window assembly 10.

Figure 4:
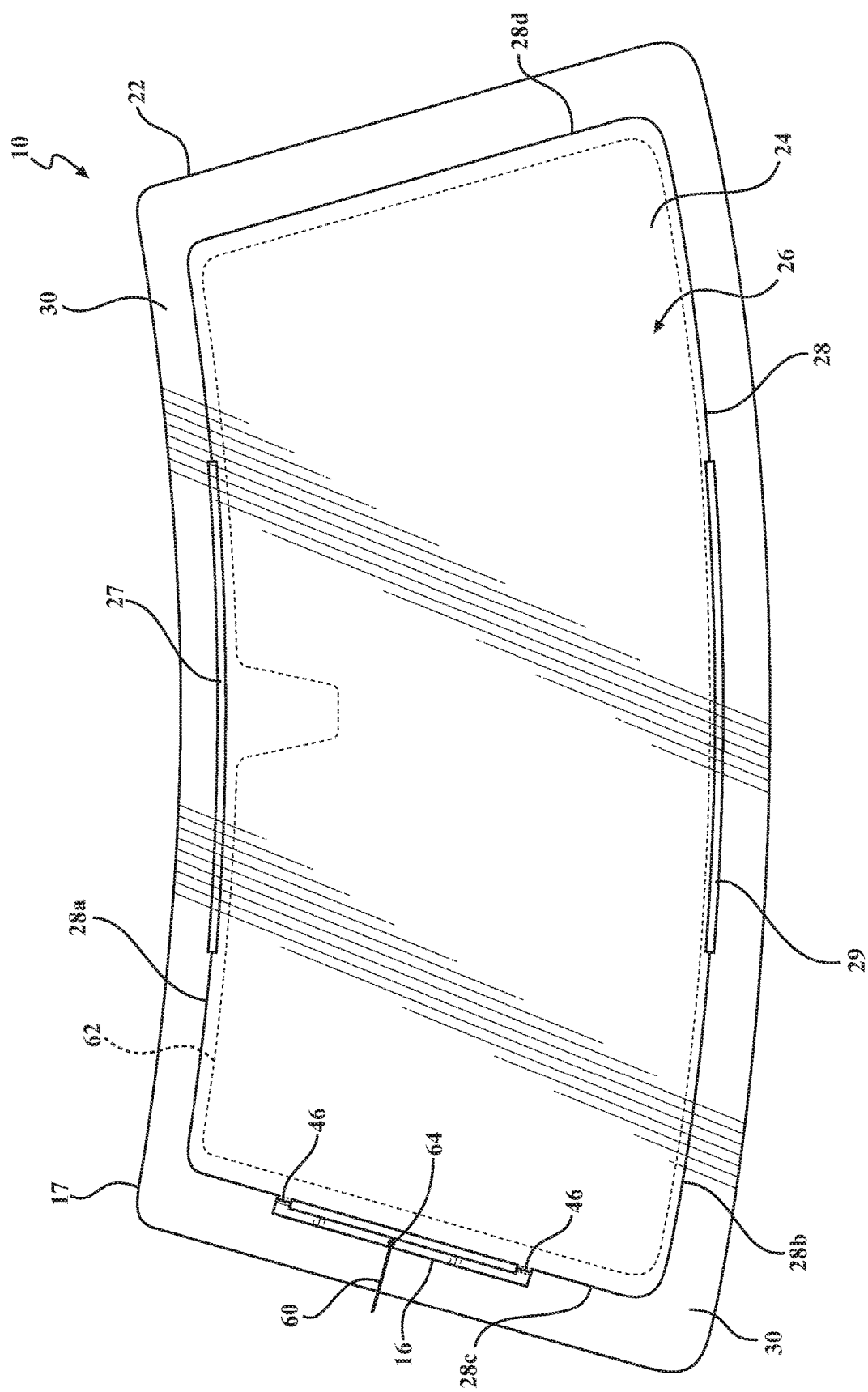
FIG. 4 is a plan view of the window assembly having the transparent layer, the antenna element, the feeding element and bus bars for heating the transparent layer, according to one embodiment of the present invention.

As shown in FIGS. 2 and 3, the exterior and interior substrates 18, 20 define a peripheral edge 22 of the window assembly 10. Conventionally, the peripheral edge 22 of the window assembly 10 is shared by the exterior and interior substrates 18, 20, as shown in FIGS. 2 and 3. Specifically, the exterior and interior substrates 18, 20 have substantially similar areas and shapes with each substrate 18, 20 having an edge forming part of the peripheral edge 22 when the substrates 18, 20 are joined. In one embodiment, as shown in FIG. 4, the peripheral edge 22 has a generally trapezoidal configuration. However, the peripheral edge 22 may have any suitable shape, such as a rectangular or oblong configuration, and the like.

As shown throughout the Figures, a transparent layer 24 is disposed on the substrate 17. In FIGS. 2 and 3, the transparent layer 24 is disposed between the exterior and interior substrates 18, 20. The window assembly 10 may include the transparent layer 24 sandwiched between the exterior and interior substrates 18, 20 such that the transparent layer 24 is abutting the substrates 18, 20. More specifically, the transparent layer 24 may be disposed on one of the inner surfaces 18*a*, 20*a* of the exterior and interior substrates 18, 20. Disposal of the transparent layer 24 between the exterior and interior substrates 18, 20 protects the transparent layer 24 from direct contact with environmental factors, which may damage the transparent layer 24 such as snow, ice, debris and the like. Alternatively, the transparent layer 24 may be disposed on the outer surface 18*b* of the exterior substrate 18 or the outer surface 20*b* of the interior substrate 20.

The transparent layer 24 is substantially transparent to light. Accordingly, a driver or occupant of the vehicle 12 may see through the window assembly 10 having the transparent layer 24. With the transparent layer 24 disposed on the substrate 17, the window assembly 10 exhibits generally greater than sixty percent visible light transmission through the window assembly 10. The transparent layer 24 preferably reflects heat from sunlight penetrating the window assembly 10. In particular, the transparent layer 24 reduces transmission of infrared radiation through the window assembly 10. Such infrared radiation is typically present in sunlight penetrating the window assembly 10.

The transparent layer 24 may include or be formed from one or more coatings or films of selected composition. The coatings or films forming the transparent layer 24 may be single or multiple layers. The transparent layer 24 may be disposed in the window assembly 10 according to any suitable method, such as chemical vapor deposition, magnetron sputter vapor deposition, spray pyrolysis, and the like.

The transparent layer 24 includes a metal compound such that the transparent layer 24 is electrically conductive. As mentioned herein, the term "electrically conductive" refers generally to a material, such as a conductor, exhibiting electrical conductivity for effectively allowing flow of electric current through the material. The transparent layer 24 may have any suitable sheet resistance or surface resistance. In one example, the transparent layer 24 has a sheet resistance in orange between 0.5-20 Ω/sq. In another example, the transparent layer 24 has a sheet resistance in a range between 8-12 Ω/sq.

In one embodiment, the metal compound of the transparent layer 24 includes a metal oxide. The metal oxide may include a tin oxide, such as indium tin oxide, or the like. The transparent layer 24 may include other metal oxides, including, but not limited to, silver oxide. Alternatively, the metal compound may include a metal nitride, and the like. The metal compound may also be doped with an additive, such as fluorine. Specifically, the additive may be included in the metal compound to optimize the light transmittance and electrical conductivity of the transparent layer 24.

As shown throughout the Figures, the transparent layer 24 defines an area 26. In one embodiment, the area 26 spans a majority of the window assembly 10. Specifically, the majority of the window assembly 10 is defined generally as greater than fifty percent of the window assembly 10. More typically, the majority is greater than seventy-five percent of the window assembly 10. The transparent layer 24 may span the majority of the window assembly 10 for maximizing the reduction of transmission of infrared radiation through the window assembly 10.

In other embodiments, the area 26 of the transparent layer 24 may span a minority of the window assembly 10. For example, the area 26 may span twenty percent of the window assembly 10 along the upper portion of the window assembly 10.

As shown throughout the Figures, the area 26 of the transparent layer 24 defines a periphery 28. The periphery 28 may define any suitable shape. The periphery 28 may also define any suitable number of edges having any suitable configuration. In one embodiment, as shown in FIG. 4, the periphery 28 defines an upper edge 28*a*, an opposing lower edge 28*b*, and a pair of opposing side edges 28*c*, 28*d* connecting the upper and lower edges 28*a*, 28*b*. In one instance, the periphery 28 defines a shape geometrically similar to the peripheral edge 22 of the window assembly 10. However, the periphery 28 may have any suitable shape for spanning the window assembly 10.

The transparent layer 24 may be energizable as a defrosting or defogging element. For example, as shown in FIG. 4, the window assembly 10 includes a first bus bar 27 and a second bus bar 29 opposite the first bus bar 27. In one embodiment, the first bus bar 27 is disposed along the upper edge 28*a* of the periphery 28 and the second bus bar 29 is disposed along the lower edge 28*b* of the periphery 28, or vice-versa. Alternatively, the first bus bar 27 may be disposed along the side edge 28*c* of the periphery 28 and the second bus bar 29 may be disposed along the opposing side edge 28*d* of the periphery 28, or vice-versa. The first and second bus bars 27, 29 are in direct electrical contact with the transparent layer 24. In one instance, the first bus bar 27 is connected to a positive terminal of a battery of the vehicle 12 and the second bus bar 27 is connected to the vehicle body and ultimately to aground terminal of a battery of the vehicle 12, or vice-versa. Electrical current passes from one of the bus bars 27, 29, through the transparent layer 24, and exits through the other one of the bus bars 27, 29 to energize the transparent layer 24. Ultimately, the electrical current passing through the transparent layer 24 heats the transparent layer 24 such that the transparent layer 24 can effectively defrost or defog. The transparent layer 24 may be energizable as a defrosting or defogging element according to various other methods and configurations. Additionally, the bus bars 27, 29 may have any suitable configuration not specifically recited herein.

As shown in FIG. 4, the transparent layer 24 occupies an entirety of the area 26 bound within the periphery 28. In such embodiments, the area 26 of the transparent layer 24 is free of deletions, slits, or voids that are formed in the area 26 for antenna purposes. Having deletions, slits, or voids in the area 26 of the transparent layer 24 for antenna purposes can be costly and can add complexity to the manufacturing process. In some embodiments, the window assembly 10 advantageously eliminates the need to modify the transparent layer 24 with costly deletions, slits, or voids within the periphery 28 of the area 26 of the transparent layer 24 for antenna purposes. In other words, in certain embodiments, the window assembly 10 does not rely on deletions, slits, or voids within the periphery 28 of the area 26 to modify antenna performance.

A vehicle device, such as a mirror or rain sensor, may be attached or mounted to the window assembly 10. Presence of the transparent layer 24 at a location where the vehicle device attaches to the window assembly 10 may adversely affect performance of the vehicle device. Therefore, the transparent layer 24 may include an opening, typically near the upper edge 28 of the transparent layer 24 to accommodate attachment of the vehicle device on the window assembly 10, as shown in FIG. 4. The opening for the vehicle device may extend into the outer region 30, as shown in FIG. 4. In another embodiment, the transparent layer 24 surrounds the opening for the vehicle device such that the opening is isolated from and does not extend into the outer region 30. Such an opening for the vehicle device is not regarded as an opening for antenna purposes, such as the above-described slits, voids, and openings, which are for antenna purposes. The opening for the vehicle device may have any suitable shape for accommodating the vehicle device.

As shown throughout the Figures, an outer region 30 is defined on the window assembly 10. The outer region 30 is devoid of the transparent layer 24. Therefore, the outer region 30 is electrically non-conductive. The outer region 30 is defined adjacent to the transparent layer 24 and along the periphery 28 of the area 26 of the transparent layer 24. In one embodiment, the outer region 30 is defined between the periphery 28 of the transparent layer 24 and the peripheral edge 22 of the window assembly 10.

As shown in FIG. 4, the outer region 30 may surround an entirety of the periphery 28 of the area 26 of the transparent layer 24. Having the outer region 30 surround an entirety of the periphery 28 advantageously provides electrical separation between the transparent layer 24 and the window frame 14. Alternatively, the outer region 30 may be defined on predetermined sections of the window assembly 10 such that the outer region 30 is not surrounding the transparent layer 24 continuously along periphery 28 of the transparent layer 24. For example, the outer region 30 may be defined adjacent to any one or more of the edges 28a-28d of the periphery 28. Additionally, the outer region 30 need not be continuously defined adjacent to the periphery 28. In other words, the outer region 30 may be defined by a plurality of discrete areas. For example, the outer region may be defined adjacent the side edges 28c, 28d of the periphery 28 but not adjacent to the upper and lower edges 28a, 28b of the periphery 28, or vice-versa.

The outer region 30 has a width defined generally by a distance between the periphery 28 of the transparent layer 24 and the peripheral edge 22 of the window assembly 10. In one embodiment, the width of the outer region 30 is greater than 1 mm and less than 25 mm. The width of the outer region 30 may vary depending upon how the window assembly 10 is fitted to the window frame 14. For example, the width of the outer region 30 may correspond to an overlap between the window frame 14 and the window assembly 10. The outer region 30 may separate the transparent layer 24 from the window frame 14 to avoid the possibility of an electrical path being established between the transparent layer 24 and the window frame 14, which may adversely affect antenna reception and radiation patterns. Furthermore, the outer region 30 protects the transparent layer 24 by separating the transparent layer 24 from the peripheral edge 22 of the window assembly 10, which is subjected to environmental factors that may degrade the quality of the transparent layer 24.

The outer region 30 may be formed on the window assembly 10 according to any suitable technique known in the art. For instance, the inner surfaces 18a, 20a of the exterior and interior substrates 18, 20 may be masked before application of the transparent layer 24 to provide a desired shape of the outer region 30. Alternatively or additionally, the transparent layer 24 may be applied to the window assembly 10 such that the transparent layer 24 is spaced from the peripheral edge 22 of the window assembly 10 to define the outer region 30. Selected portions of the transparent layer 24 may be removed or deleted to provide the desired shape of the outer region 30. Removal or deletion of selected portions of the transparent layer 24 may be accomplished using any suitable technique or device, such as by lasers, abrasive tools, chemical removal, and the like.

Although not required, an interlayer 32 may be disposed between the inner surfaces 18a, 20a of the exterior and interior substrates 18, 20, as illustrated in FIGS. 2 and 3. The window assembly 10 may include the exterior and interior substrates 18, 20 having the transparent layer 24 and the interlayer 32 sandwiched therebetween. The interlayer 32 bonds the exterior and interior substrates 18, 20 and prevents the window assembly 10 from shattering upon impact. The interlayer 32 is substantially transparent to light and typically includes a polymer or thermoplastic resin, such as polyvinyl butyral (PVB). Other suitable materials for implementing the interlayer 32 may be used. In one embodiment, the interlayer 32 has a thickness of between 0.5 mm to 1 mm. However, the interlayer 32 may have any suitable thickness. The transparent layer 24 may be disposed adjacent to the interlayer 32. In one embodiment, as shown in FIGS. 2 and 3, the transparent layer 24 is disposed between the interlayer 32 and the inner surface 20a of the interior substrate 20. Alternatively, the transparent layer 24 may be disposed between the interlayer 32 and the inner surface 18a of the exterior substrate 18. In FIGS. 2 and 3, the transparent layer 24 and interlayer 32 are sandwiched between the exterior and interior substrates 18, 20 such that the interlayer 32 and the transparent layer 24 are abutting the inner surfaces 18a, 20a of the exterior and interior substrates 18, 20. The transparent layer 24 and interlayer 32 may be disposed or layered according to any other suitable configuration not specifically referenced herein.

As referenced above, the window assembly 10 includes the antenna element 16. As shown throughout the Figures, the antenna element 16 is disposed on the substrate 17. In one embodiment, as shown in FIGS. 2 and 3, the antenna element 16 is disposed between the exterior and interior substrates 18, 20. More specifically, as shown in FIGS. 2 and 3, the antenna element 16 may be disposed between the interlayer 32 and the inner surface 20*a* of the interior substrate 20. Alternatively, the antenna element 16 may be disposed between the interlayer 32 and the inner surface 18*a* of the exterior substrate 18.

Additionally, the antenna element 16 may be disposed on the outer surface 18*b* of the exterior substrate 18 or the outer surface 20*b* of the interior substrate 20. The antenna element 16 may be disposed on the substrate 17 according to other configurations not specifically described herein.

The antenna element 16 may be disposed coplanar with the transparent layer 24. The antenna element 16 may be also disposed non-coplanar with the transparent layer 24, as shown in FIG. 2. Additionally, one portion of the antenna element 16 may be coplanar with the transparent layer 24 while another portion of the antenna element 16 is non-coplanar with the transparent layer 24. In one example, as shown in FIG. 3, a portion of the antenna element 16 overlapping the transparent layer 24 is non-coplanar with the transparent layer 24 and a portion that does not overlap the transparent layer 24 is coplanar with the transparent layer 24.

The antenna element 16 is disposed in the outer region 30 as shown throughout the Figures. In the outer region 30, the antenna element 16 is spaced from the periphery 28 of the main area 26 of the transparent layer 24. As will be described below, the antenna element 16 does connect to the transparent layer 24. However, the antenna element 16 does so without physically extending past the periphery 28 of the main area 26. Protrusions are provided to enable the antenna element 16 to connect to the transparent layer 24 from the outer region 30. As shown throughout the Figures, in one embodiment, the antenna element 16 is disposed in the outer region 30 such that antenna element 16 also does not extend beyond the peripheral edge 22 of the window assembly 10.

The antenna element 16 is electrically conductive. The antenna element 16 may be formed of any suitable conductor. The antenna element 16 may be applied to the window assembly 10 according to any suitable method, such as screen-printing, firing, adhesion and the like. In one example, the antenna element 16 comprises an electrically conductive foil or paste, such as a silver or copper foil or paste. In another example, the antenna element 16 comprises a conductive adhesive, such as a conductive tape. In yet another example, the antenna element 16 comprises metal wire.

In one embodiment, the antenna element 16 includes a substantially flat configuration. As such, the antenna element 16 may be sandwiched between the exterior and interior substrates 18, 20. In one embodiment, the antenna element 16 is substantially opaque to light such that light cannot pass through the antenna element 16. Moreover, the antenna element 16 may be applied to the window assembly 10 without any modification to the area 26 of the transparent layer 24.

As shown throughout the Figures, the antenna element 16 is elongated. The antenna element 16 has a first end 42 and a second end 44 opposite the first end 42 and stretches between the first and second ends 42, 44. In one embodiment, the antenna element 16 has a rectangular configuration with a pair of short sides and a pair of connecting elongated sides. In such embodiments, the first and second ends 42, 44 of the antenna element 16 are generally defined at the short sides of the rectangular configuration. The antenna element 16 may be elongated while having configurations other than a rectangular-type configurations. For example, the antenna element 16 may have any suitable curvature, and any suitable number of segments or portions.

Figure 5:
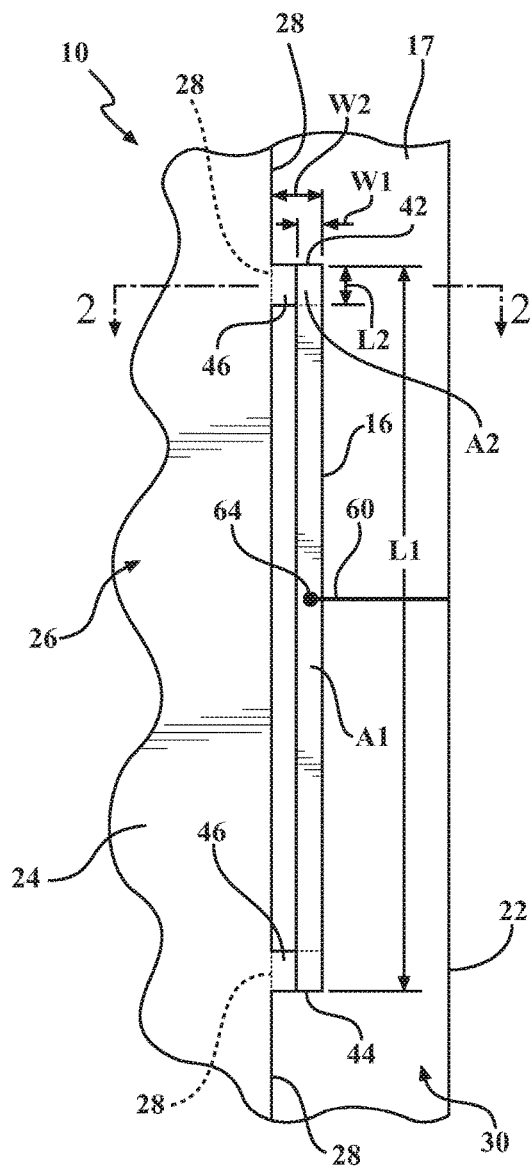
FIG. 5 is a plan view of the window assembly with the antenna element abutting and being in direct electrical connection with two protrusions integrally extending from the area of the transparent layer wherein the antenna element abuts the protrusions at opposing ends of the antenna element, according to one embodiment of the present invention.

As shown in FIG. 5, the antenna element 16 may also have an area A1 defined by a length "L1" and a width "W1." In one embodiment, the width W1 of the antenna element 16 is substantially consistent along the length L1 of the antenna element 16. Alternatively, the width W1 of the antenna element 16 may vary along the length L1 of the antenna element 16.

The length L1 of the antenna element 16 may be any suitable dimension. In one embodiment, the length L1 of the antenna element 16 is in a range between 50-150 mm. In another embodiment, the length L1 of the antenna element 16 is in a range between 130-140 mm. In one specific embodiment, the length L1 of the antenna element 16 is 135 mm. The antenna element 16 may have any suitable length L1 not specifically described herein.

Additionally, the width W1 of the antenna element 16 may be any suitable dimension. In one embodiment, the width W1 of the antenna element 16 is in a range between 1-10 mm. In another embodiment, the width W1 of the antenna element 16 is approximately 3 mm. The antenna element 16 may have any suitable width W1 not specifically described herein. The antenna element 16 may have other configurations and dimensions without departing from the scope of the invention.

In one embodiment, as shown in at least FIGS. 1, 4 and 5, the antenna element 16 extends along the periphery 28 of the transparent layer 24. Having the antenna element 16 extend along the periphery 28 may improve antenna impedance matching and radiation pattern altering, as will be described in greater detail below. In one embodiment, as shown in FIG. 5, for example, the antenna element 16 extends substantially parallel to the periphery 28. In instances where the antenna element 16 has a rectangular configuration, the elongated side of the antenna element 16 may extend parallel to the periphery 28. Having the antenna element 16 extend substantially parallel to the periphery 28 maximizes antenna impedance matching and radiation pattern altering effects by the antenna element 16.

Figure 12:
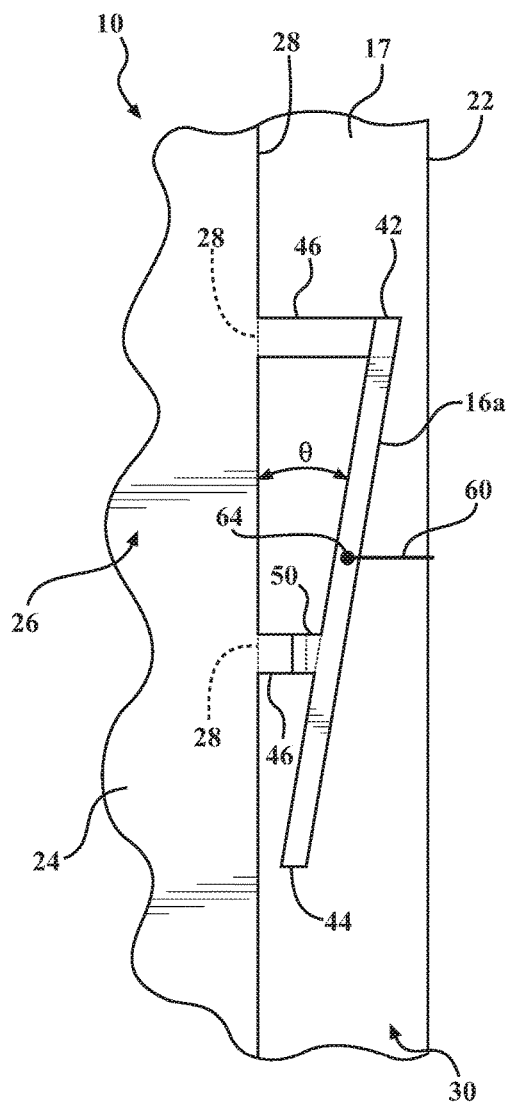
FIG. 12 is a plan view of the window assembly with protrusions having different configurations from one another and with the antenna element abutting one protrusion at one end of the antenna element and having an antenna segment between opposing ends of the antenna element abutting another one of the protrusions and with the antenna being oriented according to a predetermined angle with respect to a periphery of the area of the transparent layer, according to one embodiment of the present invention.

Alternatively, as shown in FIG. 12, the antenna element 16 extends along the periphery 28 at a predetermined angle θ. The predetermined angle θ is defined generally between the periphery 28 and an edge of the antenna element 16 facing the periphery 28. In one instance, the predetermined angle θ is approximately 10 degrees. In some instances, the first end 42 of the antenna element 16 may be disposed nearer to the periphery 28 than the second end 44 of the antenna element 16. Alternatively, the first end 42 of the antenna element 16 may be disposed further from the periphery 28 than the second end 44 of the antenna element 16.

In another embodiment, as shown in FIG. 13, the antenna element 16 is disposed substantially perpendicular to the periphery 28 of the area 26. In this example, the predetermined angle θ is approximately 90 degrees. The antenna element 16 may extend along the periphery 28 according to any suitable configuration.

In another embodiment, as shown in FIG. 14, the antenna element 16 extends partially along one of the side edges 28*c*, 28*d* of the periphery 28 and partially along one of the upper and lower edges 28*a*, 28*b* of the periphery 28. For example, the periphery 28 of the transparent layer 24 defines a corner where one of the side edges 28*c*, 28*d* of the periphery 28 connects to one of the upper and lower edges 28*a*, 28*b* of the periphery 28. The antenna element 16 extends along the corner of the periphery 28. In such embodiments, the antenna element 16 may bend or curve in the outer region 30 such that the antenna element 16 maintains spacing from the periphery 28 of the area 26 of the transparent layer 24.

Referring now to at least FIGS. 5-14, the transparent layer 24 defines at least two protrusions 46. By "at least two," it is to be understood that two or more protrusions 46, or more than one protrusion 46, is defined by the transparent layer 24. The presence of the at least two protrusions 46 is important for antenna performance, as will be described below. For simplicity, the at least two protrusions 46 are referred to hereinafter as "protrusions," when described in plurality, or "each protrusion" when described singularly.

Each protrusion 46 extends integrally from the area 26 of transparent layer 24. Each protrusion 46 is physically connected to the transparent layer 24. Because each protrusion 46 extends integrally from the area 26, each protrusion 46 is also electrically conductive. Each protrusion 46 may be formed of the identical material as the area 26. Thus, each protrusion 46 may have the same sheet resistance as the transparent layer 24. Alternatively, any of the protrusions 46 may be formed of other suitable electrically conductive materials extending integrally from the area 26. Specifically, any of the protrusions 46 may be formed of an electrically conductive transparent coating or film, different from yet still integrally extend from the area 26. In such instances, any of the protrusions 46 may exhibit a sheet resistance different from the area 26 of the transparent layer 24.

Each protrusion 46 extends coplanar with respect to the area 26 of the transparent layer 24. In other words, the protrusion 46 and the transparent layer 24 are disposed on the some layer of the window assembly 10. Specifically, as shown in one example in FIGS. 2 and 3, the protrusion 46 and the transparent layer 24 are disposed between the inner surfaces 18a, 20a of the exterior and interior substrates 18, 20. Of course, the protrusions 46 may be layered according to any other suitable configuration corresponding to layering of the transparent layer 24 described herein. When the protrusion 46 extends coplanar with respect to the area 26 of the transparent layer 24, capacitive coupling between the protrusion 46 and the transparent layer 24 is minimal. The transparent layer 24 improves performance of the protrusion 46 and the antenna element 16 by enabling greater freedom in tuning or impedance matching.

In one embodiment, it is to be understood that the protrusions 46 do not form part of the periphery 28 of the main area 26 of the transparent layer 24. As such, each protrusion 46 may be understood to extend beyond the periphery 28 of the area 26 of the transparent layer 24. As shown throughout the Figures, the periphery 28 (according to this interpretation) is indicated with a dotted line. The periphery 28 separates each protrusion 46 from the area 26 of the transparent layer 24. Thus, the area 26 and the protrusions 46 are intended to be distinct (but integral) regions according to this interpretation. Here, the periphery 28 follows a general path of each edge 28a-28d of the periphery 28 without being interrupted by presence of the protrusions 46. In other words, one of the edges 28a-28d may separate the protrusion 46 from the area 26. Thus, the periphery 28 is not intended to include any portion of the protrusions 46 under this interpretation. Similarly, the protrusions 46 are not intended to define any portion of the periphery 28 under this interpretation. The periphery 28 may be understood conceptually as being the periphery 28 of the area 26 as though the area 26 were to have no protrusions 46.

Any of the protrusions 46 may define a first end 47 and an opposing second end 48, as shown in FIGS. 2, 3, and 5. The first end 47 is disposed adjacent to and defined at the periphery 28 of the area 26. In other words, the first end 47 of the protrusion 46 and the periphery 28 may be co-linear. The second end 48 distally extends into the outer region 30. Those skilled in the art appreciate that the dotted line in the Figures separating the area 26 and the protrusions 46 is provided merely for purposes of illustrating the distinction between the area 26 and the protrusions 46. In practice, the area 26 and the protrusions 46 need not be demarcated using a dotted line, or any other line, as shown in the Figures. In other words, in reality, the protrusions 46 can extend integrally from the area 26 without any demarcation.

Alternatively, the protrusions 46 may form part of the periphery 28 of the main area 26 of the transparent layer 24. As such, each protrusion 46 may be understood to define parts of the periphery 28 of the area 26 of the transparent layer 24. The periphery 28 according to this interpretation would have the dotted line that wraps along the edges of each protrusion 46 (including the second end 48) such that the periphery 28 does not conceptually separate each protrusion 46 from the area 26 of the transparent layer 24. Although the protrusions 46 may form part of the periphery 28 according to this interpretation, it is still understood that the protrusions 46 and the area 26 are intended to be distinct (but integral) regions. Here, the periphery 28 follows a general path of each edge 28a-28d of the periphery 28 and further accounts for presence of the protrusions 46. Thus, the periphery 28 includes any portion of the protrusions 46 in such interpretations.

Thus, whether or not each protrusion 46 is interpreted to form part of the periphery 28, each protrusion 46 extends into the outer region 30. Each protrusion 46 is generally located between the periphery 28 of the area 26 and the periphery 22 of the window assembly 10. Each protrusion 46 is surrounded generally by the outer region 30 except for where each protrusion 46 extends integrally from the transparent layer 24. Said differently, each protrusion 46 integrally extends solely from the area 26 of the transparent layer 24.

The protrusions 46 are spaced apart from one another. In other words, the protrusions 46 are isolated from one another in the outer region 30. That is, the protrusions 46 generally do not integrally connect to one another in the outer region 30. As will be described below, the protrusions 46 may connect, albeit not integrally, via the antenna element 16.

Any of the protrusions 46 may have a uniform thickness corresponding to the thickness of the area 26 of the transparent layer 24. Alternatively, any of the protrusions 46 may have any suitable thickness greater than or less than the area 26 of the transparent layer 24. Furthermore, the protrusions 46 may be formed during or after formation of the area 26 of the transparent layer 24 to the window assembly 10.

Figure 9:
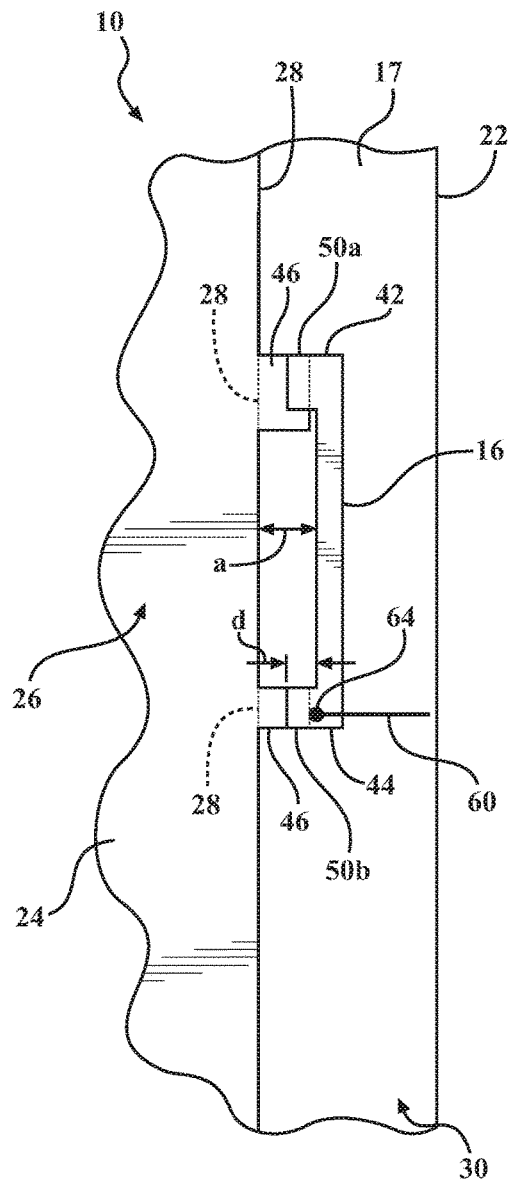
FIG. 9 is a plan view of the window assembly with the antenna element having antenna segments extending from opposing ends of the antenna element with one of the antenna segments abutting and being in direct electrical connection with one of the protrusions having a length (L2) greater than a length (L3) of the antenna segment and with the feeding element coupled to the antenna element at one of the protrusions, according to one embodiment of the present invention.
Figure 10:
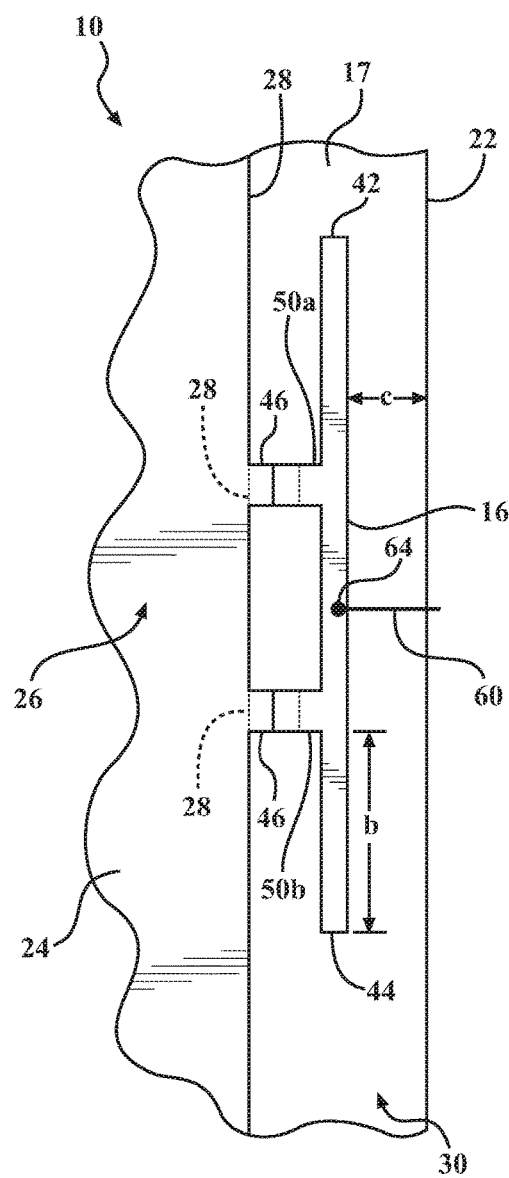
FIG. 10 is a plan view of the window assembly with the antenna element having antenna segments extending from between opposing ends of the antenna element with the antenna segments each abutting and being in direct electrical connection with one of the protrusions and with the feeding element coupled to the antenna element at a location between the protrusions, according to one embodiment of the present invention.
Figure 11:
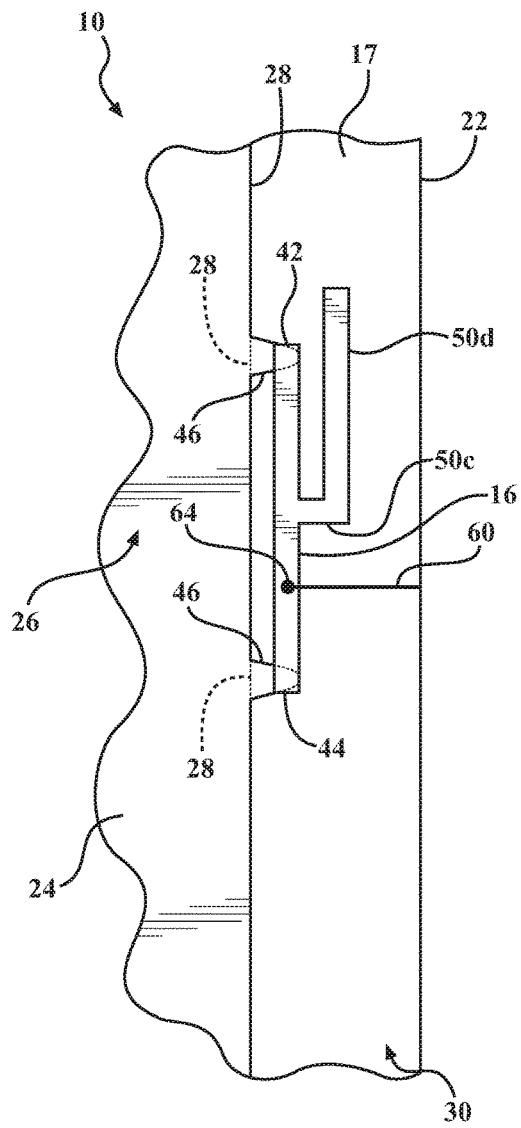
FIG. 11 is a plan view of the window assembly with protrusions having a trapezoidal configuration and with the antenna element abutting and being in direct electrical connection with two protrusions at opposing ends of the antenna element and with the antenna element having at least one antenna segment extending away from the transparent layer, according to one embodiment of the present invention.

In one example, as shown in FIGS. 5-10, for example, the protrusions 46 have a substantially rectangular configuration. Alternatively, the protrusions 46 may have any other suitable configuration, such as a semi-circular, trapezoidal (as shown in FIG. 11), or triangular configuration. Additionally, the protrusions 46 may have different configurations from one another. Alternatively, each protrusion 46 may have substantially the same configuration.

The protrusions 46 may also have any suitable dimensions. Depending on the shape, the protrusions 46 may each have an area A2 defined by a length L2 and a width W2. The length L2, in one embodiment, may be in a range between 1-10 mm, 1-5 mm, or 3-4 mm. The width W2, in one embodiment, may be in a range between 1-10 mm, 1-5 mm, or 3-4 mm. The length L2 and the width W2 of any given protrusions 46 may be the some or different. Furthermore, one protrusion 46 may have a different length L2 or width W2 than another protrusion 46. Alternatively, any of the protrusions 46 may have the same length L2, the some width W2, or the same length L2 and width W2. Those skilled in the art appreciate that the protrusions 46 may have other suitable dimensions not specifically recited herein.

In one embodiment, as shown in FIGS. 5-13, the protrusions 46 extend from a common one of the edges 28a-28 of the area 26. For example, as shown in FIGS. 5-13, all of the protrusions 46 extend from one of the side edges 28c, 28d. In other embodiments, one of the protrusions 46 extends from one of the edges 28a-28d and another one of the protrusions 46 extends from another one of the edges 28a-28d. For example, as shown in FIG. 14, one protrusion 46 extends from the upper edge 28a while another protrusion 46 extends from the side edge 28a. Those skilled in the art appreciate that any of the protrusions 46 may extend from any of the edges 28a-28d of the periphery 28.

Preferably, each protrusion 46 occupies a minority of the outer region 30 such that there is space in the outer region 30 for presence of the antenna element 16. In one embodiment, each protrusion 46 occupies a negligible portion of the outer region 30. The outer region 30 may have any suitable dimensions, configuration, or shape for accommodating the protrusion 46 and antenna element 16.

In one embodiment, as shown in at least FIGS. 5-12, the protrusions 46 include solely a single segment (identified using numeral 46 for simplicity). Alternatively, as shown in FIG. 13, any of the protrusions 46 may include a plurality (n) of segments 46a-46n. Any of the segments 46a-46n may extend integrally from the main segment extending integrally from the area 26. Any of the segments 46a-46n may also extend integrally from another segment 46a-46n. Any of the characteristics or configurations described above demonstrating how the protrusions 46 integrally extend from the area 26 may also apply equally to describe how any of the segments 46a-46n extend from the main protrusions 46 or from other segments 46a-46n.

The segments 46a-46n may ultimately provide any of the protrusions 46 with a more complex configuration than those described above. For example, the protrusions 46 in FIG. 13 each form an L-shape. In FIG. 13, the protrusions 46 extend towards one another yet remain spaced from one another as described above. Of course, with many segments 46a-46n, any other suitable configuration is possible, including, but not limited to, a T-shape, F-shape, J-shape, C-shape, H-shape, or the like.

As shown throughout the Figures, the antenna element 16 abuts and is in direct electrical contact with the protrusions 46. The antenna element 16 is directly adjacent to the at least two protrusions 46 such that the antenna element 16 and the at least two protrusions 46 are in a directly contacting state. The antenna element 16 may abut the protrusions 46 according to various configurations. In one embodiment, as shown in FIGS. 2 and 3, the antenna element 16 is disposed directly on any of the protrusions 46 or stacked atop of any of the protrusions 46. Portions of the antenna element 16 (such as a portion directly connected to a protrusion 46) may be non-coplanar with the protrusions 46 while other portions of the antenna element 16 (such as a portion not directly connected to a protrusion 46) may be disposed coplanar with the protrusions 46, as shown in FIG. 3. Alternatively, an entirety of the antenna element 16 may be disposed coplanar or non-coplanar with the protrusions 46. The antenna element 16 may be in direct electrical contact with the protrusions 46 using any suitable technique, such as conductive soldering, conductive adhesives, or by means of the sandwiching the exterior and interior substrates 18, 20, or the like. By abutting the protrusions 46, a DC connection is provided between the antenna element 16 and the transparent layer 24. In providing the DC connection, the antenna element 16 allows a footprint of the antenna element 16 to be substantially minimized.

In one embodiment, the antenna element 16 abuts and directly contacts the transparent layer 24 solely at the at least two protrusions 46 in the outer region 30. In other words, in this embodiment, the antenna element 16 does not abut or directly contact the transparent layer 24 at anywhere but the protrusions 46. In such embodiments, the antenna element 16 may be surrounded entirely by the outer region 30 except for where the antenna element 16 abuts and is in direct electrical contact with the protrusions 46. Alternatively, the antenna element 16 may abut and directly contact the transparent layer 24 at an additional location unrelated to or distinct from the protrusions 46. In other words, in this embodiment, the antenna element 16 abuts or directly contacts the transparent layer 24 somewhere in addition to the protrusions 46.

The antenna element 16 may abut and be in direct electrical contact with any protrusion 46 according to any suitable configuration. For example, the protrusions 46 may contact the antenna element 16 anywhere along the length L1 of the antenna element 16. In one embodiment, as shown in at least FIGS. 7 and 10, the antenna element 16 abuts and is in direct electrical contact with the protrusions 46 between the first and second ends 42, 44 of the antenna element 16. In other words, the protrusions 46 are not contacting the antenna element 16 at any of he first and second ends 42, 44. In another embodiment, as shown in at least FIGS. 8, 12 and 13, the antenna element 16 abuts and is in direct electrical contact with one of the protrusions 46 at one of the first and second ends 42, 44 and the antenna element 16 abuts and is in direct electrical contact with another one of the protrusions 46 between the first and second ends 42, 44. In yet another embodiment, as shown in FIGS. 5, 6, 9, 11, and 14, the antenna element 16 abuts and is in direct electrical contact with one of the protrusions 46 at the first end 42 and the antenna element 16 abuts and is in direct electrical contact with another one of the protrusions 46 at the second end 44.

Figure 8:
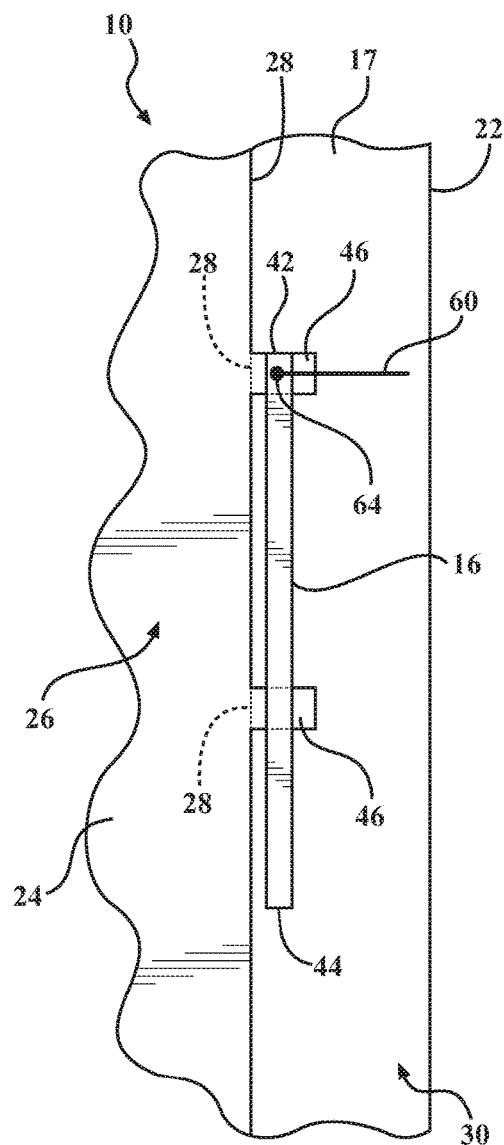
FIG. 8 is a plan view of the window assembly with the antenna element abutting and being in direct electrical connection with two protrusions between the opposing ends of the antenna element with the protrusions extending beyond the antenna element and with the feeding element coupled to the antenna element at one of the protrusions, according to one embodiment of the present invention.

The antenna element 16 may also contact the protrusions 46 anywhere along the length L2 of the protrusions 46. In one embodiment, as shown in at least FIG. 8, the antenna element 16 contacts any of the protrusions 46 between the first and second ends 47, 48 of any of the protrusions 46. The protrusion 46 may extend past the antenna element 16, as shown in FIG. 8. In another embodiment, as shown in at least FIGS. 5-7, and 9-12, the antenna element 16 contacts one of the protrusions 46 at one of the first and second ends 47, 48 of one of the protrusions 46, and more specifically the second end 48 of the protrusions 46. In such embodiments, the antenna element 16 generally contacts one of the protrusions 46 at the second end 48 such that the protrusion 46 generally does not extend past the antenna element 16.

The antenna element 16 may abut and be in direct electrical contact with two or more protrusions 46. Additionally, the antenna element 16 may abut and be in direct electrical contact with less than all of the protrusions 46 provided. For example, if three protrusions 46 extend integrally from the area 26, the antenna element 16 may abut and be in direct electrical contact with only two of the protrusions 46 without abutting and being in direct electrical contact with the third protrusion 46.

As shown in at least FIGS. 6, 9, 10 and 12, the antenna element 16 may include at least one antenna segment 50a-50n extending towards one of the protrusions 46. The antenna element 16 may include any number of antenna segments 50 to connect to the protrusions 46. The antenna segments 50 abut and are in direct electrical contact with the protrusions 46. In doing so, the antenna segment 50 crosses into the area A2 of the protrusion 46. Any suitable portion of the antenna segment 50 may cross into the area A2 of the protrusion 46. Generally, the antenna segment 50 extends towards the protrusion 46 without crossing the periphery 28 of the area 26 of the transparent layer 24. In other words, the antenna segment 50 does not extend past the first end 47 of the protrusion 46.

Figure 6:
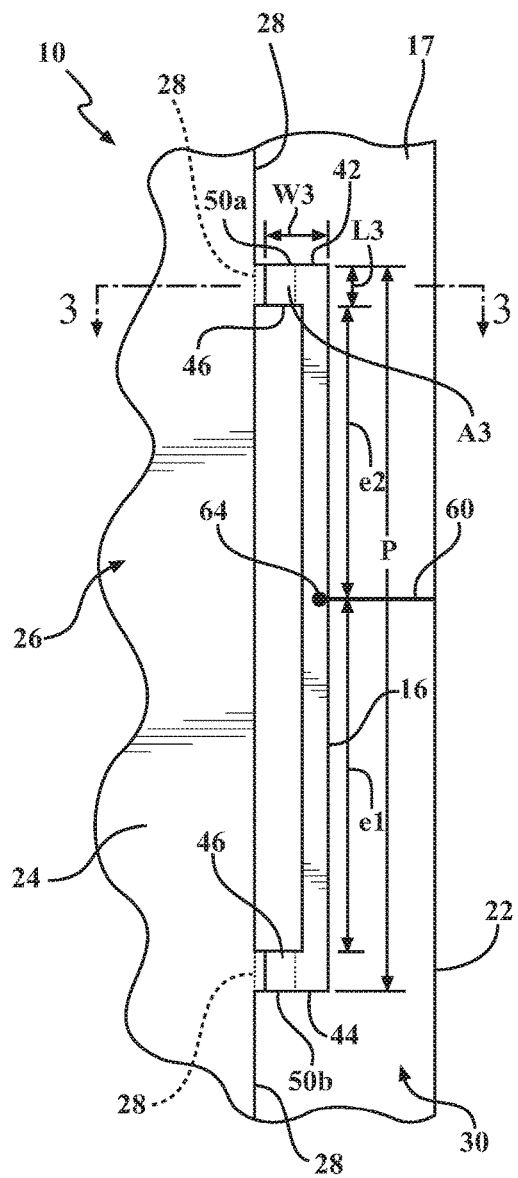
FIG. 6 is a plan view of the window assembly with the antenna element having antenna segments extending from opposing ends of the antenna element with the antenna segments each abutting and being in direct electrical connection with one of the protrusions integrally extending from the area of the transparent layer, according to one embodiment of the present invention.
Figure 7:
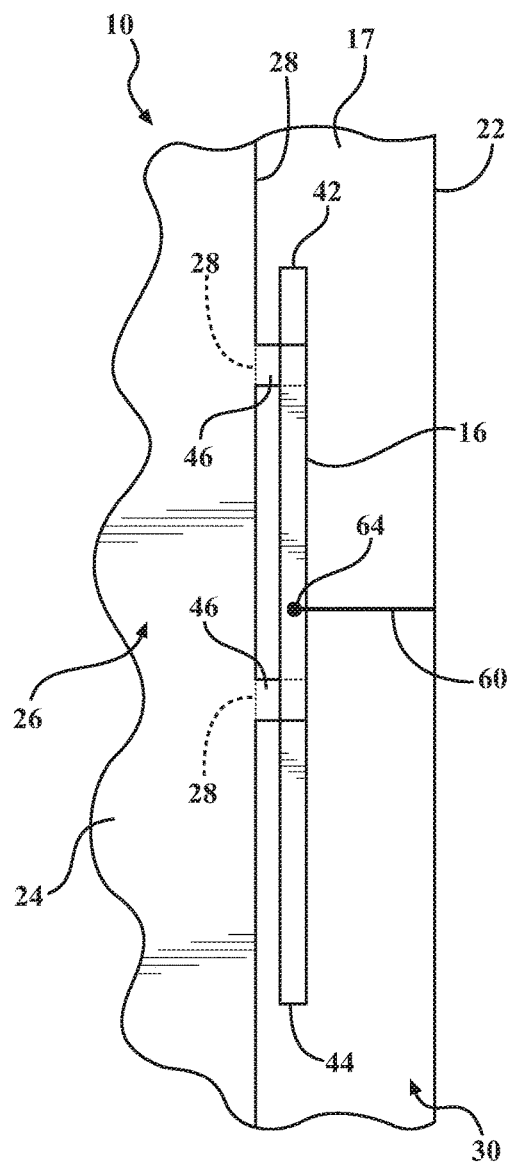
FIG. 7 is a plan view of the window assembly with the antenna element abutting and being in direct electrical connection with two protrusions between the opposing ends of the antenna element and with the feeding element coupled to the antenna element at a location between the protrusions, according to one embodiment of the present invention.

The antenna segment 50 may extend from the antenna element 16 according to various configurations. In one embodiment, as shown in at least FIGS. 6, 9 and 10 the antenna segment 50 extends substantially perpendicular from the antenna element 16. In FIGS. 10 and 12, the antenna segment 50 extends from the antenna element 16 between the first and second ends 42, 44 of the antenna element 16. In such instances, the antenna segment 50 is spaced from each one of the first and second ends 42, 44 of the antenna element 16. In FIGS. 6 and 9, the antenna segment 50 extends from one of the first and second ends 42, 44 of the antenna element 16. In such instances, antenna element 16 forms an L-shape configuration. In other embodiments, the antenna segment 50 extends from the antenna element 16 at a predetermined angle (e.g., other than 90 degrees), such as shown in FIG. 12.

Any of the antenna segments 50a-50n may also extend integrally from another antenna segment 50a-50n. The antenna segments 50a-50n need not all connect to protrusions 46. That is, the antenna element 16 may include one antenna segment 50 that connects to one of the protrusions 46 while having other antenna segments 50 that do not connect to any protrusions 46.

The antenna segments 50a-50n may ultimately provide the antenna element 16 with a more complex configuration. For example, the antenna segments 50 may provide the antenna element 16 with any suitable configuration, including, but not limited to, a T-shape, F-shape, J-shape, C-shape, H-shape, or the like.

In one embodiment, the antenna segment 50 has a rectangular configuration with a pair of short sides and a pair of connecting elongated sides. The antenna segment 50 may have other configurations, such as a square, trapezoidal, triangular, semi-circular, oblong configuration, and the like.

As shown in FIG. 6, the antenna segment 50 may also define an area A3 having a length "L3" and a width "W3." In one embodiment, the width W3 of the antenna segment 50 is substantially consistent along the length L3 of the antenna segment 50. Alternatively, the width W3 of the antenna segment 50 may vary along the length L3 of the antenna segment 50. The length L3 of the antenna segment 50 may be any suitable dimension. In one embodiment, the length L3 of the antenna segment 50 is in a range between 1-5 mm. The width W3 of the antenna segment 50 may be any suitable dimension. In one embodiment, the width W3 of the antenna segment 50 is in a range between 1-5 mm. The antenna segment 50 may have other configurations without departing from the scope of the invention.

The length L1 of the antenna element 16 may be longer than the length L3 of the antenna segment 50. Alternatively, the length L1 of the antenna element 16 may be shorter than the length L3 of the antenna segment 50. Moreover, the length L1 of the antenna element 16 may be equal to the length L3 of the antenna segment 50. In another example, the width W1 of the antenna element 16 is wider than the width W3 of the antenna segment 50. Alternatively, the width W1 of the antenna element 16 may be narrower than the width W3 of the antenna segment 50. Furthermore, the width W1 of the antenna element 16 may be equal to the width W3 of the antenna segment 50. In other embodiments, the area A1 of the antenna element 16 may be greater than the area A3 of the antenna segment 50. The area A1 of the antenna element 16 may be less than the area A3 of the antenna segment 50. Moreover, the area A1 of the antenna element 16 may be equal to the area A3 of the antenna segment 50.

In certain embodiments, as shown in at least FIGS. 6, 9 and 10, the antenna element 16 comprises a first antenna segment 50a and a second antenna segment 50b spaced apart from one another. Each of the antenna segments 50a, 50b extends towards one of the protrusions 46. The first antenna segment 50a abuts and is in direct electrical contact with one of the protrusions 46 and the second antenna segment 50b abuts and is in direct electrical contact with another one of the protrusions 46.

The first and second antenna segments 50a, 50b may extend from the antenna element 16 according to various configurations. In one embodiment, as shown in at least FIGS. 6, 9 and 10, the first and second antenna segments 50a, 50b extend substantially perpendicular from the antenna element 16. The first and second antenna segments 50a, 50b may also extend from a common edge or different edges of the antenna element 16. In at least FIG. 10, each of the first and second antenna segments 50a, 50b extend from the antenna element 16 between the first and second ends 42, 44 of the antenna element 16. In such instances, the first and second antenna segments 50a, 50b are each spaced from each one of the first and second ends 42, 44 of the antenna element. In other embodiments, the first antenna segment 50a extends from one of the first and second ends 42, 44 of the antenna element 16 and the second antenna segment 50b extends from between the first and second ends 42, 44. In yet another embodiment, as shown in at least FIGS. 6 and 9, the first antenna segment 50a extends from the first end 42 and the second antenna segment 50b extends from the second end 44.

In one embodiment, the first and second antenna segments 50a, 50b extend integrally from the antenna element 16. Alternatively, the first and second antenna segments 50a, 50b may be formed separately such that the antenna segments 50a. 50b extend non-integrally from the antenna element 16.

The antenna element 16 and any antenna segments 50 are configured to transmit or receive radio signals. Furthermore, the antenna segments 50 play an important role in optimizing antenna performance of the window assembly 10. For example, any of the antenna segments 50 may operate to alter radiation patterns and provide impedance matching. In one embodiment, the antenna element 16 and the antenna segments 50 both operate to alter radiation patterns and provide impedance matching. In another embodiment, the antenna element 16 has an emphasized role in operating to alter radiation patterns while the antenna segment 50 has an emphasized role in providing impedance matching, or vice-versa.

The antenna segments 50 operate to provide impedance matching by matching impedance of the antenna element 16, the antenna segment 50, and the transparent layer 24 to an impedance of a cable or circuit. The cable, for example, may be a cable, such as a coaxial cable, that is connected to a feeding element that energizes the antenna element 16, as will be described below. The circuit, for example, may be an amplifier that connects to the antenna element 16 through a cable or lead wire, and the like.

The antenna segments 50 may also operate to alter radiation patterns by altering directions by which radio signals are transmitted or received by the antenna element 16, the antenna segment 50, and the transparent layer 24. More specifically, the antenna segments 50 may alter directions by which radio signal are transmitted or received such that the radiation pattern(s) exhibit greater omni-directionality. By doing so, the antenna segments 50 provide greater control over radiation patterns. The antenna segments 50 further help to counteract electromagnetic interference to ensure optimal reception. As such, the antenna segments 50 enhance antenna performance.

At higher frequencies, the elongated portion of the antenna element 16 has an emphasized role in radiation pattern alternation. At lower frequencies, the elongated portion of the antenna element 16 has an emphasized role in impedance matching. The functionality and advantages of the antenna segments 50 described herein apply fully and equally to the antenna element 16, as a whole, and to any other antenna segments of the antenna element 16 that do not directly connect to one of the protrusions 46.

Antenna performance is further fine-tuned based upon the strategic and dimensioning of the antenna element 16 and antenna segment 50 and positioning of such in relation to the transparent layer 24 and each other. For instance, the length L1/L3, width W1/W3, and area A1/A3 of the antenna element 16 and antenna segment 50 each have a significant impact on antenna performance. Other examples of strategic positing and dimensioning of the antenna element 16 and antenna segment 50 include, but are not limited to (i) a distance "a" between the antenna element 16 and the periphery 28 of the transparent layer 24 (see FIG. 9), (ii) a distance "b" between the antenna segment 50 and the first and second ends 42, 44 of the antenna element 16 (see FIG. 10), (iii) a distance "c" between the antenna element 16 and the peripheral edge 22 of the window assembly 10 (see FIG. 10), and (iv) a distance "d" defining an overlap between the antenna element 16 and the protrusion 46 (see FIG. 9), and the like.

The antenna element 16 and the transparent layer 24 each have an electrical conductivity. In one embodiment, the electrical conductivity of the antenna element 16 is of a higher order of magnitude than the electrical conductivity of the transparent layer 24. By having the electrical conductivity configured as such, more electrical current concentrates in the antenna element 16 than the transparent layer 24. This allows for greater impact on impedance matching and radiation pattern alteration while allowing a reduction in the footprint of the antenna element 16. In another embodiment, the electrical conductivity of the elongated portion of the antenna element 16 may be of a different magnitude than the electrical conductivity of any antenna segment 50.

As shown throughout the Figures, the window assembly 10 includes a feeding element 60. As shown in the Figures, the feeding element 60 is coupled to the antenna element 16. The feeding element 60 energizes the antenna element 16. The feeding element 60 may also energize the transparent layer 24.

As shown throughout the Figures, the feeding element 60 couples to the antenna element 16 at a location further defined as a feed point 64. Thus, any discussion below regarding where or how the feeding element 60 couples to the antenna element 16 also applies equally to define where or how the feed point 64 couples to the antenna element 16.

The feeding element 60 couples to the antenna element 16 at a location that is defined with the protrusions 46 taken into account. FIG. 6 illustrates a range "p" defined between an outer edge of one protrusion 46 and an outer edge of another protrusion 46. This range "p" defines where along the antenna element 16 the feeding element 60 may abut. It is to be appreciated that the range "p" may have other configurations other than that shown in FIG. 6 depending on at least the location, size, and configuration of the protrusions 46.

In one embodiment, as shown in at least FIGS. 5, 6, 7, 10-14, the feeding element 60 couples to the antenna element 16 between the at least two protrusions 46. In other words, the feeding element 60 couples to the antenna element 16 between where the antenna element 16 abuts the protrusions 46. This is somewhere along the antenna element 16 between inner edges of the protrusions 46. In FIG. 6, for example, the feeding element 60 may abut the antenna element 16 anywhere within the range of "e1" or "e2" which collectively define a range between the inner edges of the protrusions 46.

In another embodiment, as shown in FIGS. 8 and 9, the feeding element 60 couples to the antenna element 16 at one of the protrusions. In other words, the feeding element 60 couples to the antenna element 16 where the antenna element 16 abuts one of the protrusions 46. To illustrate, the feeding element 60 couples to the antenna element 16 anywhere between the length L3 of either protrusion 46, as shown in FIG. 6.

In either embodiment described above, the location at which the feeding element 60 couples to the antenna element 16 is within or at the limits of the range "p." As such, assuming there are only two protrusions 46, the feeding element 60 generally does not extend past the outer edge of either protrusions 46. Of course, where there are more than two protrusions 46, there may be more than one range "p1 . . . pn" where the feeding element 60 can be coupled to the antenna element 16.

As described above, where the feeding element 60 is situated on the antenna element 16 is largely defined with respect to length. However, whether the feeding element 60 is coupled to the antenna element 16 at or between the protrusions 46, the feeding element 60 may also couple to the antenna element 16 within the width W2 of any of the protrusions 46 or beyond the width W2 of any of the protrusions 46. For example, as shown in FIGS. 5, 7, 8, 11, 13 and 14, the feeding element 60 is defined within the width W2 of the protrusions 46 such that the feeding element 60 is effectively located between the first and second ends 47, 48 of the protrusions 46. Alternatively, as shown in FIGS. 6, 9 and 10, the feeding element 60 is defined beyond or past the width W2 of the protrusions 46 such that the feeding element 60 is effectively located past the second end 48 of the protrusions 46. In other examples, as shown in FIG. 12, for instance, the feeding element 60 is defined beyond or past the width W2 of one protrusion 46 and the feeding element 60 is defined within the width W2 of another protrusion 46.

In addition to the location of the feeding element 60 relative to the protrusions 46, the feeding element 60 may couple to the antenna element 16 according to various additional configurations. In FIGS. 5, 6, 7, 10-14, the feeding element 60 is coupled between the first and second ends 42, 44 of the antenna element 16. In such configurations, the feeding element 60 is spaced from each one of the first and second ends 42, 44 of the antenna element 16. Furthermore, it is to be appreciated that the location of the feeding element 60 being between the protrusions 46 may or may not require the location of the feeding element 60 to also be between the first and second ends 42, 44 of the antenna element 16.

Alternatively, as shown in FIGS. 8 and 9, the feeding element 60 is coupled to the antenna element 16 at one of the first and second ends 42, 44 of the antenna element 16. It is to be appreciated that the location of the feeding element 60 being at one of the protrusions 46 may or may not require the location of the feeding element 60 to also be at one of the first and second ends 42, 44 of the antenna element 16.

In other embodiments, the feeding element 60 couples to the antenna segment 50. The feeding element 60 may be positioned with respect to the antenna element 16 according to various other configurations not specifically recited herein.

The feeding element 60 is disposed on the window assembly 10 according to various configurations. As shown throughout the Figures, the feeding element 60 is disposed in the outer region 60. In such instances, the feeding element 60 is spaced from the transparent layer 24 such that feeding element 60 does not directly abut the transparent layer 24. The feeding element 60 may be disposed entirely within the outer region 30. Alternatively, part of the feeding element 60 may be disposed in the outer region 30. Furthermore, the feeding element 60 may be disposed beyond the outer region 30. For instance, the feeding element 60 may partially extend beyond the peripheral edge 22 of the window assembly 10. This allows the feeding element 60 to connect easily to corresponding electrical systems or the vehicle 12 during manufacturing. Having the antenna element 16 disposed along the periphery 28 of the transparent layer 24 allows for simplified feeding arrangements because the feeding element 60 generally must connect to antenna element 16 from the peripheral edge 22 of the window assembly 10.

The feeding element 60 may be layered on the substrate 17 according to various configurations. In one embodiment, as shown in FIG. 2, the transparent layer 24, the antenna element 16, and the feeding element 60 are all sandwiched between the exterior and interior substrates 18, 20. The feeding element 60 may be disposed coplanar or non-coplanar with respect to the antenna element 16. As shown in FIG. 2, the feeding element 60 is disposed between the interlayer 32 and the inner surface 20a of the interior substrate 20. Alternatively, the feeding element 60 may be disposed between the interlayer 32 and the inner surface 18a of the exterior substrate 18. The feeding element 60 may also be disposed on the outer surface 18b, 20b of one of the exterior and interior substrates 18, 20, as shown in FIG. 3.

According to one embodiment, as shown in FIG. 2, the feeding element 60 is abutting and in direct electrical connection with the antenna element 16. The feeding element 60 may pass electrical current to the antenna element 16 directly through an electrically conductive material, such as a feeding strip or wire, physically attached to the antenna element 16. For example, the feeding element 60 may be directly wired or soldered to the antenna element 16. In one embodiment, the feeding element 60 is non-coplanar with the antenna element 16 and directly connected atop the antenna element 16. In another embodiment, the feeding element 60 is coplanar with the antenna element 16 and directly connected to the antenna element 16. The feeding element 60 and the antenna element 16 may be abutting and in direct electrical connection according to several other configurations with respect to the transparent layer 24 and the interlayer 32 not specifically illustrated throughout the Figures.

Alternatively, as shown in FIG. 3, the feeding element 60 may be spaced from and capacitively coupled to the antenna element 16. In such instances, the feeding element 60 induces electrical current to the antenna element 16 through the air or a dielectric material, such as the exterior or interior substrates 18, 20 and interlayer 32. When capacitively coupled, the feeding element 60 is neither hard-wired nor in direct contact with the antenna element 16 and is generally disposed non-coplanar with the antenna element 16. In one embodiment, as shown in FIG. 3, the feeding element 60 is disposed on the outer surface 20b of the interior substrate 20 and capacitively coupled to the antenna element 16 disposed between the interlayer 32 and the inner surface 20a of the interior substrate 20. The feeding element 60 may be spaced from and capacitively coupled to the antenna element 16 on the window assembly 10 according to several other embodiments with respect to the transparent layer 24 and the interlayer 32, which are not specifically illustrated throughout the Figures.

The feeding element 60 is configured to energize the antenna element 16 and the transparent layer 24 such that the antenna element 16 and the transparent layer 24 collectively transmit or receive radio frequency signals. In one embodiment, the feeding element 60 jointly energizes the antenna element 16 and the transparent layer 24. The feeding element 60 is electrically coupled to the antenna element 16 and the transparent layer 24 such that the antenna element 16 and the transparent layer 24 operate as active antenna elements for excitation or reception of radio frequency waves.

With respect to the feeding element 60, the term "energize" is understood to describe an electrical relationship between the feeding element 60 and the antenna element 16 and transparent layer 24 whereby the feeding element 60 excites the antenna element 16 and transparent layer 24 for transmission of radio waves or for reception of impinging radio waves.

The feeding element 60 may include any suitable material for energizing the antenna element 16. As shown throughout the Figures, the feeding element 60 couples to the antenna element 16 at the feed point 64. The feed point 64 may be disposed at various locations with respect to the feeding element 60. In one embodiment, the feeding element 60 includes a coaxial line having a center conductor coupled to the antenna element 16 at the feed point 64 and a ground conductor grounded to the window frame 14. In other embodiments, the feeding element 60 includes a feeding strip, a feeding wire, or a combination of both. In addition, the feeding element 60 may be a balanced or unbalanced line. For example, the feeding element 60 may be an unbalanced coaxial cable, micro strip, or single wire line. Furthermore, the feeding element 60 may include any suitable feeding network for providing phase shifting to the radio frequency signal transmitted or received by the antenna element 16. The feeding element 60 may also couple to the antenna element 16 at a plurality of feed points 62.

In one embodiment, the antenna element 16 and the transparent layer 24 collectively transmit or receive linearly polarized radio frequency signals. For instance, the antenna element 16 and the transparent layer 24 may collectively transmit or receive radio frequency signals for at least one of Remote Keyless Entry (RKE), Digital Audio Broadcasting (DAB), FM, cellular and TV applications.

Antenna performance is further fine-tuned based upon the strategic dimensioning of the feeding element 60 and positioning of such in relation to the antenna element 16 and the transparent layer 24. As shown in FIG. 6, one example of such strategic positing and dimensioning of the feeding element 60 includes a distance "e" between the feed point 64 of the feeding element 60 and any one or plurality of protrusions 46. In FIG. 6, the distance "e1" between the feed point 64 and one protrusion 46 is different than the distance "e2" between the feed point 64 and another protrusion 46.

In one embodiment, the feeding element 60 and the antenna element 16 may be integrated into a single component. The single component including the feeding element 60 and the antenna element 16 may be readily removed and attached to the window assembly 10. In one example, the single component includes conductors or traces embedded within an electrically isolating member. The single component may have a substantially flat configuration such that the single component may be easily sandwiched between the interior and exterior substrates 18, 20. The single component may include a mating connector for connecting to the corresponding electrical system, such as the electrical system of the vehicle 12, and the like.

The outer region 30 may have any suitable dimensions, configuration, or shape for accommodating the antenna element 16 and feeding element 60. For instance, the outer region 30 may have a rectangular configuration, a curved configuration, or the like. More specifically, outer region 30 may follow a substantially linear path, curved path, or the like. The outer region 30 may be sized such that the antenna element 16 and the feeding element 60 substantially occupy the outer region 30. In other words, the outer region 30 may be sized to the extent necessary to effectively accommodate the antenna element 16 and feeding element 60. As such, the area 26 of the transparent layer 24 is maximized for its other functions, such as an antenna radiating element or an element for reflecting infrared radiation penetrating the window assembly 10. Alternatively, the antenna element 16 and feeding element 60 may occupy only a minority of the outer region 30. Disposal of the antenna element 16 and feeding element 60 in the outer region 30 provides an unobstructed field of view for the driver of the vehicle 12.

In one embodiment, the antenna element 16 and the feeding element 60 are positioned such that the antenna element 16 and the feeding element 60 cause minimal obstruction to the vision of an occupant of the vehicle 12. As mentioned above, in many embodiments, the antenna element 16 and the feeding element 60 are disposed substantially in the outer region 30 such that the antenna element 16 and the feeding element 60 do not obstruct the vision of the occupant. Moreover, as shown throughout the Figures, the window assembly 10 may include an opaque layer 62 that is applied to one of the interior and exterior substrates 18, 20. The opaque layer 62 is non-conductive and conceals the antenna element 16 and the feeding element 60 for an aesthetically appealing configuration. As shown throughout the Figures, the opaque layer 62 extends from the peripheral edge 22 of the window assembly 10 towards the transparent layer 24. Specifically, the opaque layer 62 extends past the periphery 28 of the transparent layer 24. By doing so, the opaque layer 62 conceals the antenna segment 50 that extends into the transparent layer 24 thereby completely concealing the antenna element 16. In one embodiment, the opaque layer 62 is formed of a ceramic print 62.

The window assembly 10 may also include a plurality of antenna elements 16 and a plurality of feeding elements 60. In one embodiment, a single feeding element 60 is coupled to a single antenna element 16. Such configurations may be defined as a single-port configuration. Alternatively, the single feeding element 60 may connect to the antenna element 16 at a plurality of feed points 62. In such configurations, the feeding element 60 may include a conductor coupled to each feed point 64. The conductors may be connected, or spliced together, such that only a single conductor is required to enter the feeding element 60 for energizing the antenna element 16 at the plurality of feed points 62. In yet another embodiment, a single feeding element 60 is coupled to a plurality of antenna elements 16. Such configurations may be defined as a multi-port configuration. In such instances, the feeding element 60 may connect to each of the antenna elements 16 at a separate feed point 64. In such configurations, the single feeding element 60 may include separate conductors each coupled to each separate antenna element 16. In such instances, the feeding element 60 effectively operates as two separate feeding elements 60 consolidated into a single feeding unit. The feeding element 60 may couple to various other parts of the antenna element(s) 16.

Where many antenna elements 16 are provided, a controller, such as a signal processor 100, may connect to the antenna elements 16. The signal processor 100 is configured to select or combine radio frequency signals transmittable or receivable by the antenna elements 16. By doing so, the antenna elements 16 may operate in diversity. By operating in diversity, the antenna elements 16 transmit or receive radio frequency signals in multiple directions within a field of reception to minimize interference and temporary fading of the signal. In one example, the antenna elements 16 operate in conjunction with the transparent layer 24 to transmit radio signals for TV applications.

Figure 15:
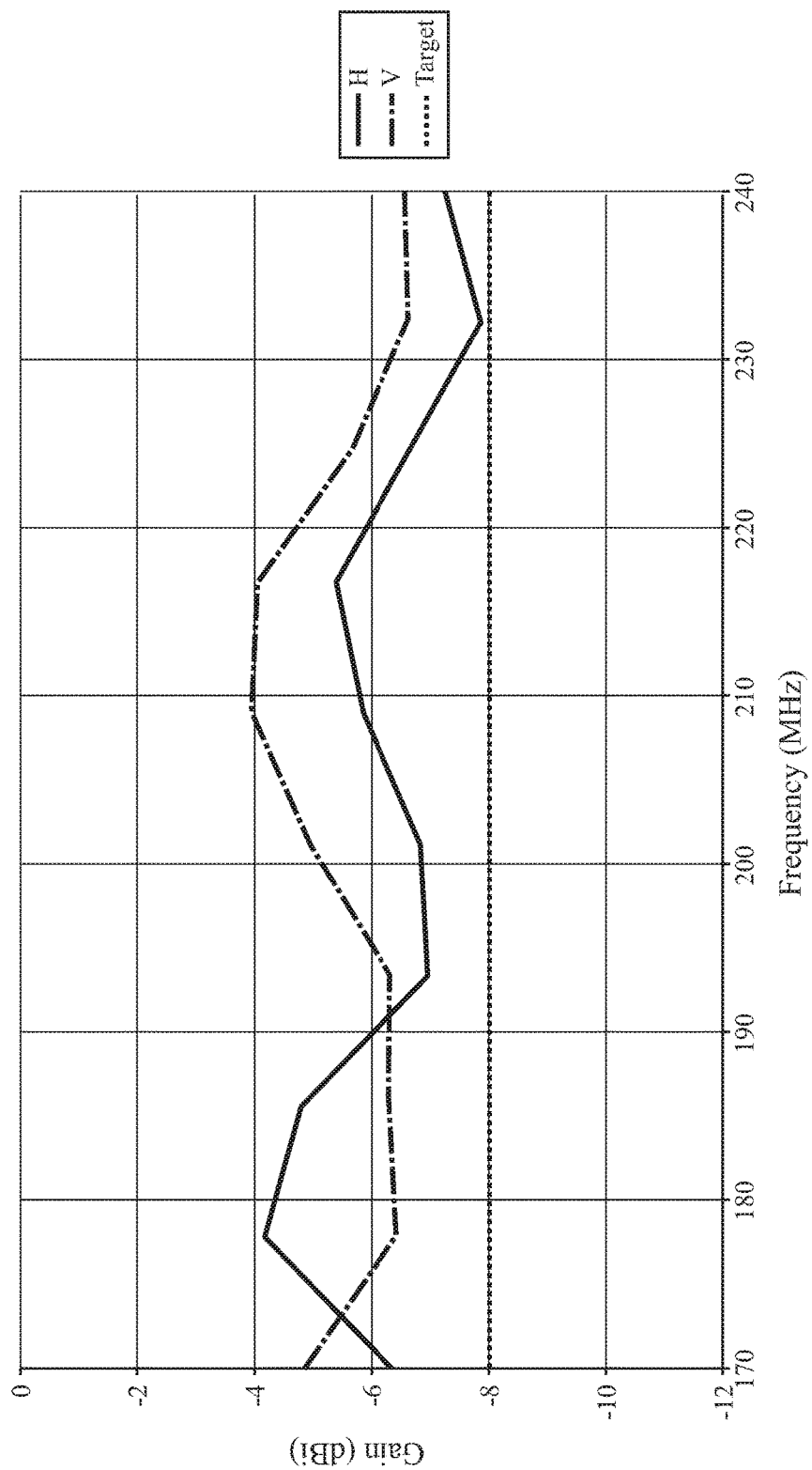
FIG. 15 is a frequency-gain chart illustrating antenna performance of the window assembly in TV Band 3, according to one embodiment of the present invention.

FIGS. 15 and 16 are charts illustrating antenna performance of the window assembly 10 according to one embodiment where the antenna element 16 is directly connects to two protrusions 46 in accordance with the techniques described herein. The protrusions 46 in this embodiment are approximately 135 mm apart. The feeding element 60 connects to the antenna element 16 at the feed point 64 located approximately 50 mm from one protrusion 46 and approximately 85 mm from the other protrusion 46. The feeding element 60 utilizes a wire having an 80 mm length. There are no bus bars 27, 29 provided adjacent to the antenna element 16.

FIG. 15 illustrates performance of this embodiment using a frequency-gain chart where vertical (V) and horizontal (H) polarizations are measured in TV Band 3 (United States). TV band 3 is more commonly known as the VHF band and is usually in defined by the frequency range between 174-216 MHz. FIG. 15 illustrates antenna gain measured in dBi (isotropic).

As shown in FIG. 15, the window assembly 10 of this embodiment exhibits gains greater than the target gain of −8 dBi throughout the entirety of the TV Band 3 frequency range for both vertical and horizontal polarizations. The antenna gain for vertical polarization reaches as high as −4 dBi near the high end of the TV Band 3 range. The antenna gain for horizontal polarization reaches as high as −4.2 dBi near the low end of the TV Band 3 range and as high as −5.5 dBi near the high end of the TV band 3 range.

FIG. 16 illustrates performance of this embodiment with a frequency-gain chart where vertical and horizontal polarizations are utilized in TV Bands 4 and 5 (United States). TV bands 4 and 5 are more commonly known as the UHF bands and collectively are in the frequency range between 520-698 MHz. FIG. 16 illustrates antenna gain measured in dBi (isotropic).

As shown in FIG. 16, the window assembly 10 of this embodiment exhibits gains greater than the target gain of −8 dBi throughout the entirety of the frequency range of TV Bands 4 and 5 for vertical polarization and gains greater than the target of −8 dBi throughout a majority of the frequency range of TV Bands 4 and 5 for horizontal polarizations. Near the center of the frequency range of TV Bands 4 and 5, the antenna gain reaches as high as −2 dBi for vertical polarization and as high as −3.8 dBi for horizontal polarization.

Those skilled in the art appreciate that the characteristics and advantages of the performance of the window assembly 10 as illustrated in FIGS. 15 and 16 are provided for illustrative purposes based on a specific embodiment and are not intended to limit operation or scope of the subject invention. Depending on various configurations of the components described herein, the window assembly 10 may exhibit other advantageous antenna performance other than that illustrated herein.

The present invention has been described herein in an illustrative manner. It is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

The invention claimed is:

1. A window assembly comprising:
a substrate;
a transparent layer disposed on said substrate and comprising a metal compound such that said transparent layer is electrically conductive and with said transparent layer defining an area having a periphery;
an outer region devoid of said transparent layer and being defined on said substrate adjacent to and along said periphery of said transparent layer;
an antenna element disposed on said substrate in said outer region with said antenna element being elongated and defining a first end and an opposing second end; and
a feeding element coupled to said antenna element for energizing said antenna element;
wherein said area of said transparent layer defines at least two protrusions being spaced apart from one another and extending integrally from said area and into said outer region and wherein said antenna element abuts and is in direct electrical contact with said at least two protrusions and wherein said feeding element couples to said antenna element at a location between said at least two protrusions or at one of said protrusions.

2. A window assembly as set forth in claim 1 wherein said antenna element connects to said transparent layer solely at said at least two protrusions.

3. A window assembly as set forth in claim 1 wherein said antenna element is entirely surrounded by said outer region except for where said antenna element abuts and is in direct electrical contact with said at least two protrusions.

4. A window assembly as set forth in claim 1 wherein said location at which said feeding element couples to said antenna element is further defined as a feed point.

5. A window assembly as set forth in claim 1 wherein said antenna element extends along said periphery.

6. A window assembly as set forth in claim 1 wherein said at least two protrusions integrally extend solely from said area of said transparent layer such that said at least two protrusions are isolated from one another in said outer region.

7. A window assembly as set forth in claim 1 wherein said periphery of said area of said transparent layer is defined by a plurality of edges and wherein one of said protrusions extends from one of said edges and wherein another one of said protrusions extends from another one of said edges.

8. A window assembly as set forth in claim 1 wherein said antenna element abuts and is in direct electrical contact with said at least two protrusions between said first and second ends.

9. A window assembly as set forth in claim 1 wherein said antenna element abuts and is in direct electrical contact with one of said protrusions at one of said first and second ends and wherein said antenna element abuts and is in direct electrical contact with another one of said protrusions between said first and second ends.

10. A window assembly as set forth in claim 1 wherein said antenna element abuts and is in direct electrical contact with one of said protrusions at said first end and wherein said antenna element abuts and is in direct electrical contact with another one of said protrusions at said second end.

11. A window assembly as set forth in claim 1 wherein said antenna element comprises at least one antenna segment extending towards one of said protrusions and wherein said at least one antenna segment abuts and is in direct electrical contact with said one of said protrusions.

12. A window assembly as set forth in claim 11 wherein said least one antenna segment extends from one of said first and second ends.

13. A window assembly as set forth in claim 11 wherein said least one antenna segment extends from between said first and second ends.

14. A window assembly as set forth in claim 1 wherein said antenna element comprises a first antenna segment and a second antenna segment spaced apart from one another and each extending towards one of said protrusions and wherein said first antenna segment abuts and is in direct electrical contact with one of said protrusions and wherein said second antenna segment abuts and is in direct electrical contact with another one of said protrusions.

15. A window assembly as set forth in claim 14 wherein said first and second antenna segments each extend between said first and second ends.

16. A window assembly as set forth in claim 14 wherein said first antenna segment extends from one of said first and second ends and wherein said second antenna segment extends from between said first and second ends.

17. A window assembly as set forth in claim 14 wherein said first antenna segment extends from said first end and wherein said second antenna segment extends from said second end.

18. A window assembly as set forth in claim 1 wherein said antenna element is comprised of electrically conductive foil.

19. A window assembly as set forth in claim 1 wherein said antenna element is screen printed on to said substrate.

20. A window assembly as set forth in claim 1 wherein said feeding element is spaced from and capacitively coupled to said antenna element.

21. A window assembly as set forth in claim 1 wherein said feeding element is abutting and in direct electrical contact with said antenna element.

22. A window assembly as set forth in claim 1 wherein said substrate further comprises an exterior substrate and an interior substrate and wherein said transparent layer and said antenna element are sandwiched between said exterior and interior substrates.

23. A window assembly as set forth in claim 1 wherein said substrate further comprises an exterior substrate and an interior substrate and wherein said transparent layer, said antenna element, and said feeding element are sandwiched between said exterior and interior substrates.

24. A window assembly as set forth in claim 1 wherein said antenna element is formed of a metallic print.

25. A window assembly as set forth in claim 1 wherein said antenna element and said feeding element are integrated into a single component.

* * * * *